(12) United States Patent
Kruyer

(10) Patent No.: US 10,399,008 B2
(45) Date of Patent: Sep. 3, 2019

(54) OLEOPHILIC SEPARATION APPARATUS

(71) Applicant: Jan Kruyer, Thorsby (CA)

(72) Inventor: Jan Kruyer, Thorsby (CA)

( * ) Notice: Subject to any disclaimer, the term of this patent is extended or adjusted under 35 U.S.C. 154(b) by 0 days.

(21) Appl. No.: 15/939,844

(22) Filed: Mar. 29, 2018

(65) Prior Publication Data
US 2018/0280833 A1    Oct. 4, 2018

(51) Int. Cl.
| | |
|---|---|
| *B01D 33/11* | (2006.01) |
| *B01D 17/04* | (2006.01) |
| *B01D 33/00* | (2006.01) |
| *B01D 33/067* | (2006.01) |
| *B01D 33/44* | (2006.01) |
| *B01D 35/18* | (2006.01) |
| *C10G 1/00* | (2006.01) |
| *C10G 1/04* | (2006.01) |

(52) U.S. Cl.
CPC ....... *B01D 17/045* (2013.01); *B01D 33/0019* (2013.01); *B01D 33/0025* (2013.01); *B01D 33/067* (2013.01); *B01D 33/11* (2013.01); *B01D 33/44* (2013.01); *B01D 35/18* (2013.01); *C10G 1/00* (2013.01); *C10G 1/045* (2013.01); *B01D 2221/04* (2013.01); *B01D 2257/702* (2013.01); *B01D 2257/80* (2013.01)

(58) Field of Classification Search
None
See application file for complete search history.

(56) References Cited

FOREIGN PATENT DOCUMENTS

CA    1167792 A1  *  5/1984

* cited by examiner

*Primary Examiner* — Chester T Barry

(57) ABSTRACT

An oleophilic separation apparatus has a rotatable metal cage and at least one oleophilic sieve in frictional engagement with the rotatable metal cage. The oleophilic sieve is made of an oleophilic material such that a bitumen phase adheres to the oleophilic sieve upon contact. A plurality of apertures in the oleophilic sieve allows aqueous phase to escape from the rotatable metal cage. A hot zone is provided that has at least one rotation member and a source of heat. The oleophilic sieve is in frictional engagement with the at least one rotation member. The hot zone heats the bitumen phase adhered to the oleophilic sieve to allow for collection of the bitumen phase.

28 Claims, 13 Drawing Sheets

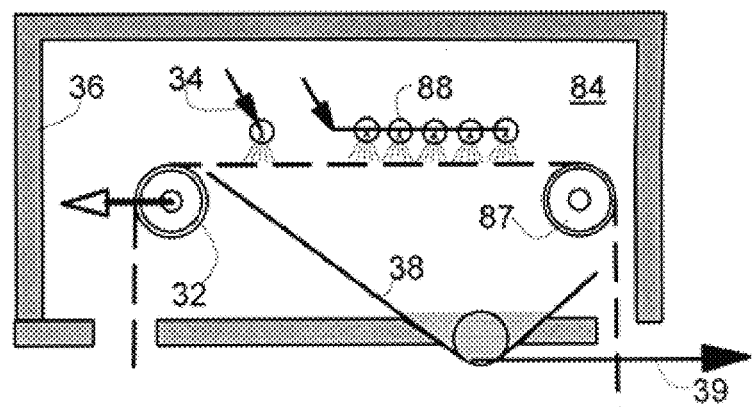
Fig. 9
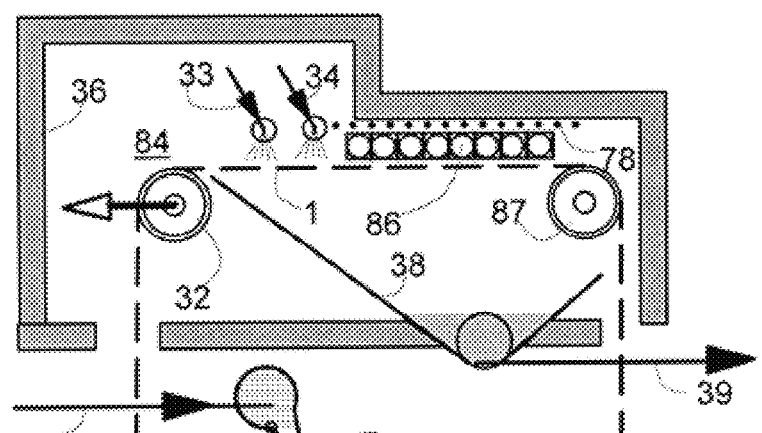
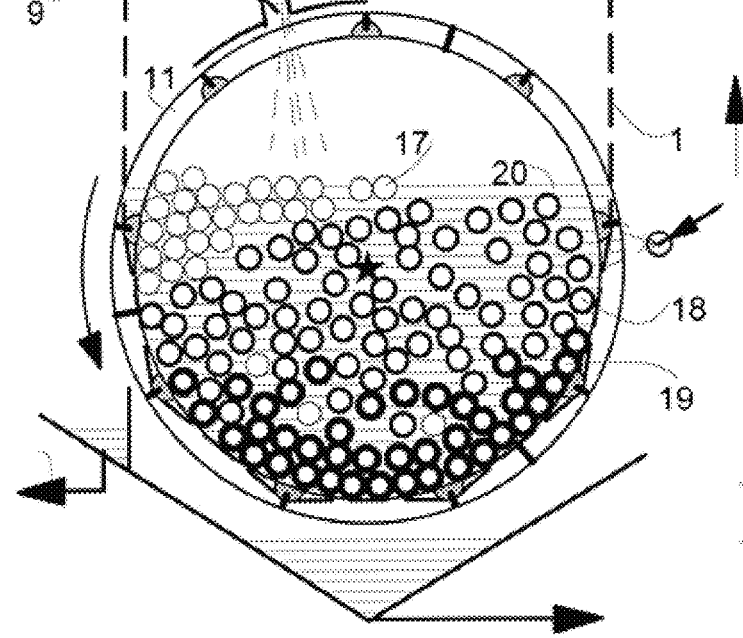
Fig. 8

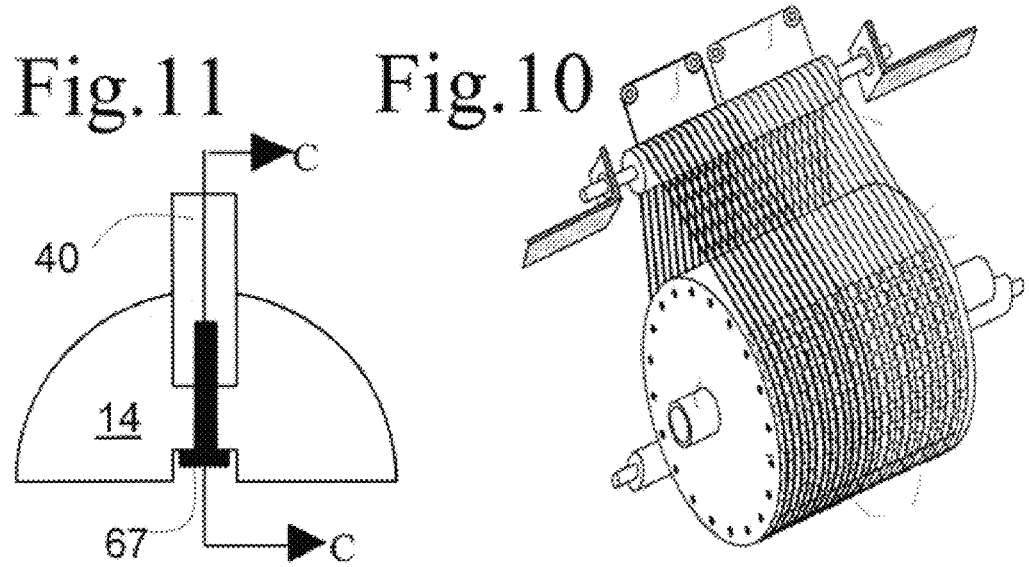
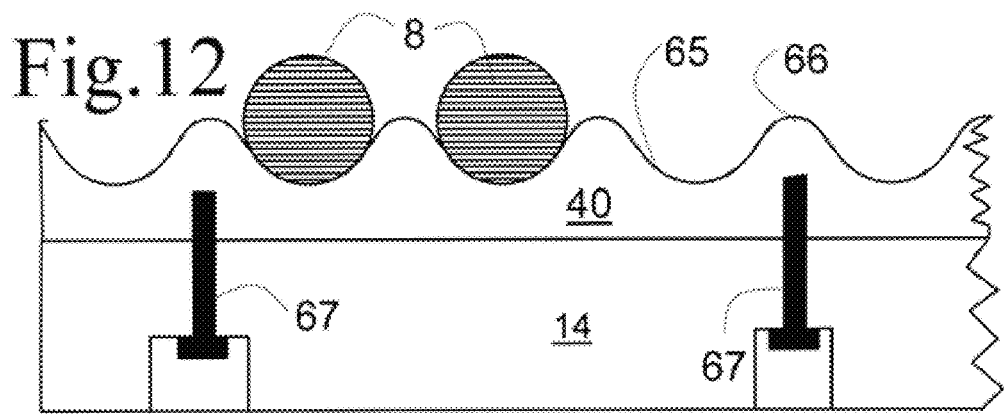
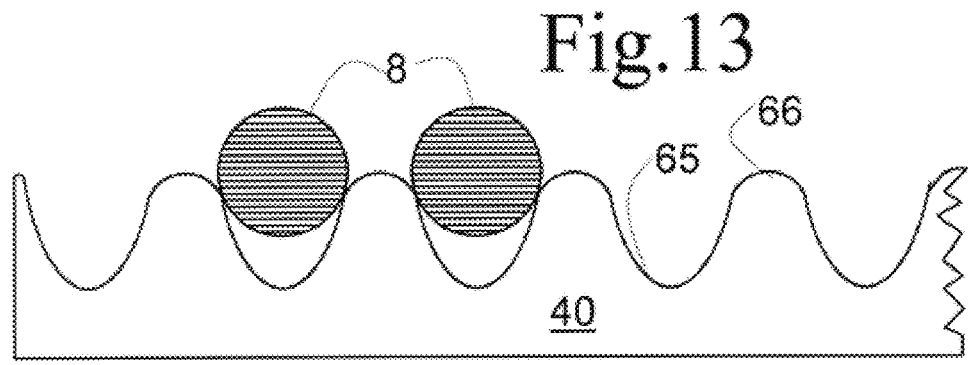

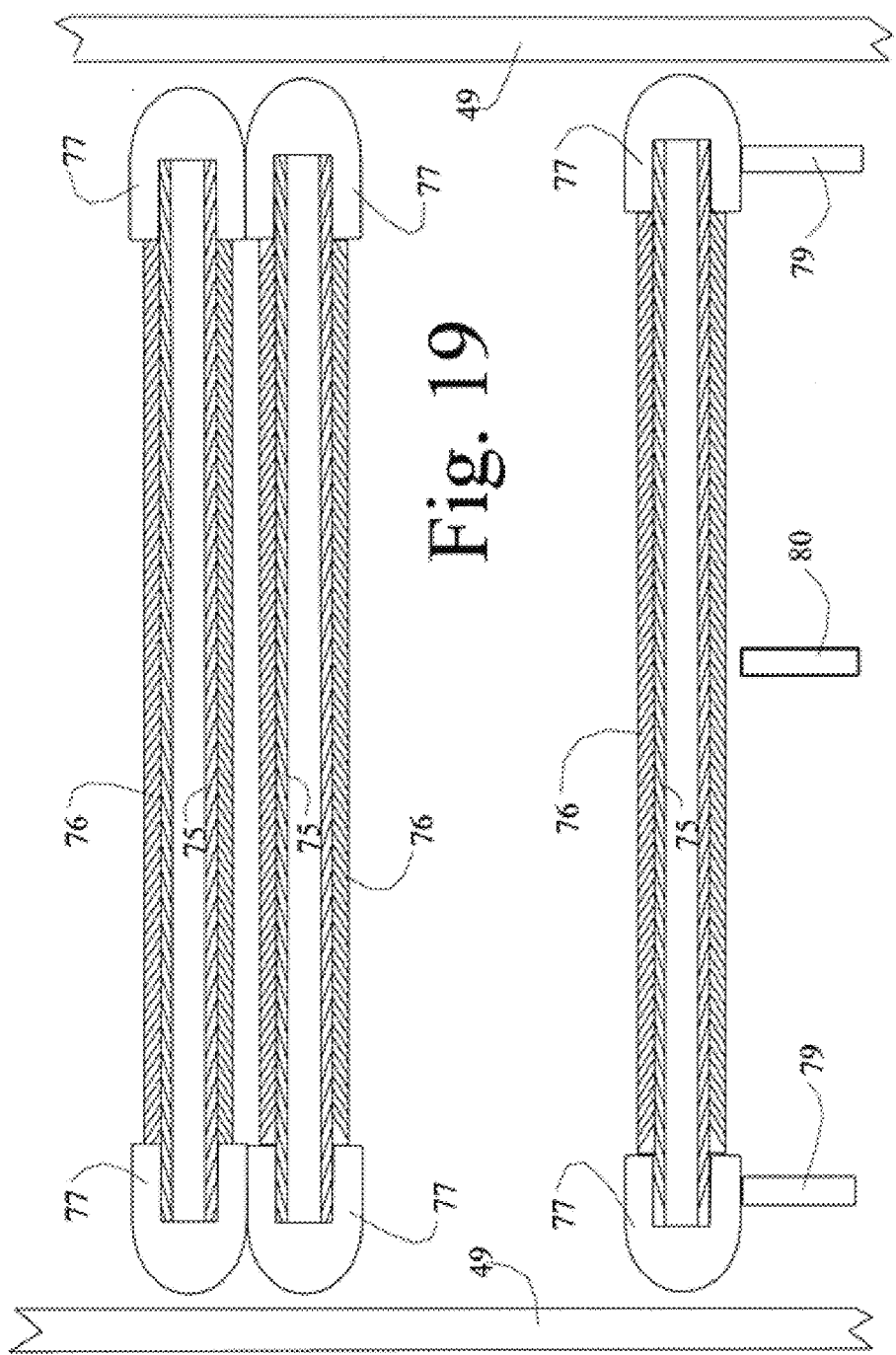

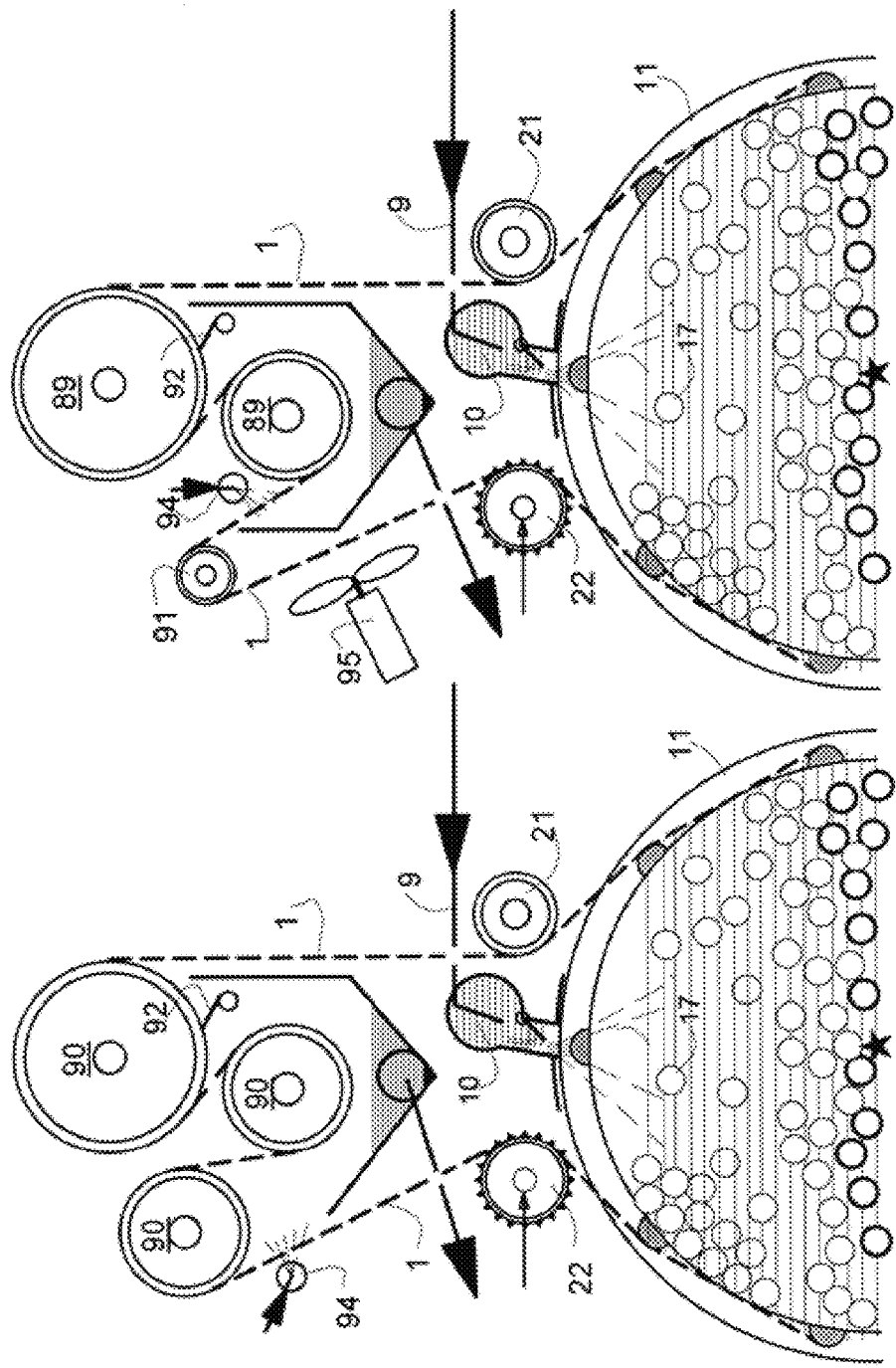

OLEOPHILIC SEPARATION APPARATUS

FIELD OF THE DISCLOSURE

The present application relates generally to devices and methods for separating water and hydrophilic particulate mineral matter from bitumen (viscous hydrocarbon) and oleophilic particulate mineral matter. More particularly, the present application relates to an apparatus for separating a fluid mixture of viscous oleophilic phase and hydrophilic phase fluids using an oleophilic sieve.

BACKGROUND

This section provides background information to facilitate a better understanding of the various aspects of the invention. It should be understood that the statements in this section of this document are to be read in this light and not as admission of prior art.

The concept of separating oleophilic matter from hydrophilic matter goes back as far as the year 425 BC where Herodotus, a Greek historian and traveler, observed maidens on an island drawing cold bitumen coated feathers through wet beach sand to collect gold dust by oleophilic adhesion. Many centuries later, in 1860, William Hanes separated oleophilic sulfide from hydrophilic gangue material using froth flotation of oil wetted sulfide. In 1920 Karl Clark invented a bitumen froth flotation process to separate bitumen droplets from mined oil sand by using air bubbles to cause bitumen to float as a froth.

Currently commercial separation of mined oil sand slurries is done by the Clark froth flotation process invented in 1920 by Dr. Karl Clark at the Alberta Research Council and progressively improved thereafter to increase separation efficiency from an optimum 90% bitumen recovery to the current 95% bitumen recovery from water based slurries of mined oil sand ore that contain at least 10% bitumen. Process temperature of the slurry feed, as a result of continued froth flotation research, was reduced from 95° C. to 50° C. to conserve energy. However, the current commercial process still requires 6 hours (360 minutes) of separation time to capture by flotation about 95% of the bitumen contained in the mined ore used to form the slurry.

Froth flotation requires the addition of a caustic chemical to react with components in the oils and feed to form a detergent or dispersant to yield a water based slurry containing suspended small droplets or films of bitumen in the water based slurry. These droplets or films attach to small air bubbles introduced into the slurry and rise to the top of separation vessels to yield an aerated bitumen froth product that is skimmed off the vessel's top. The process requires very large flotation vessels and several recycle loops to optimize bitumen product quality and recovery. After that, the bitumen froth is deaerated and processed by dilution centrifuging or solvent extraction to yield an acceptable bitumen product for further refining and upgrading to synthetic crude oil and/oil refinery products.

Froth flotation leaves behind long duration tailings ponds that contain fluid fine tailings (FFT) of water, suspended fines and between 5% and 10% of the bitumen contained in an oil sand slurry. The FFT must be impounded indefinitely in sealed tailings ponds so as to prevent leakage into the adjacent groundwater, rivers or lakes. It is estimated that the current mined oils and tailings ponds contain in excess of one billion barrels of discarded bitumen which, according to pilot plant studies, are easily recovered by oleophilic separation, taking less than 10 minutes of process residence time for the separation. Microbial action in those ponds result in the generation of methane release to the environment.

In 1975 the present inventor invented the concept of using an oleophilic sieve to separate bitumen from a feed of mined oil sand slurried in water. In his process, the feed passed through an oleophilic sieve which captures bitumen phase on sieve surfaces and allows aqueous phase and hydrophilic minerals particles to pass through sieve apertures. Since then he has continued to perfect that previously untried concept. Oleophilic separation was developed to replace bitumen froth flotation as well as minerals froth flotation.

BRIEF SUMMARY

In current up-to-date oleophilic separation a fluid containing bitumen, oleophilic particulate minerals, water and hydrophilic particulates enters a rotating metal cage and mixes with oleophilic surfaced bodies inside the cage. Balls or long rods strip bitumen phase and adhering oleophilic mineral particulates from the fluid to be separated and transfer these to the oleophilic sieve surfaces, whilst water and hydrophilic mineral particulates pass through the sieve apertures as aqueous phase to disposal or further processing. Additional bitumen tends to be collected by sieve surfaces as aqueous phase passes through apertures of the sieve. Oleophilic sieves convey the transferred and collected bitumen phase from the cage through a hot zone to heat the sieve and its adhering oleophilic phase, thereby reducing its viscosity to cause it to flow from the sieve surfaces into a product receiver in the hot zone for further processing.

This allow for the separation of 1) mined oil sand slurry, 2) tailings pond fluid fine tailings that contain the effluent of bitumen froth flotation, 3) bitumen froth product of bitumen froth flotation to remove air and water, 4) mineral ores into product and gangue by using bitumen as the glue to collect valuable minerals and bitumen as a product and hydrophilic gangue and water as the aqueous phase and, 5) any other fluid that contains oleophilic material and hydrophilic material when dispersed in water.

The present application describes the use of oleophilic sieves comprising conventional open area metal conveyor belts or closely spaced wraps of metal or plastic endless rope covering part of the circumference of a horizontal rotating metal cage to separate a fluid of water, bitumen and mineral particulates into bitumen phase and hydrophilic phase. Tumbling oleophilic rods inside the rotating cage mix with the fluid to be separated, capture bitumen phase from the mixture and transfer it to oleophilic sieve surfaces. Water and hydrophilic minerals, known as the aqueous phase, exit the cage by passing through apertures of the sieve. The sieve revolves with the cage through contact with longitudinal members of the cage. From there the sieve and contained bitumen phase moves to and through a hot zone above the cage where heat reduces the viscosity of bitumen phase on the sieve and causes it to flow into a collection container for further processing. From there the oleophilic sieve continuously revolves back to the cage to collect more bitumen phase. While most of the bitumen phase of the fluid to be separated is collected by the oleophilic rods inside the cage for transfer to the oleophilic sieve(s), some bitumen phase is captured by the sieve surfaces upon contact as the aqueous phase passes through the sieve apertures.

The apparatus as described uses a rotating metal cage with end walls, longitudinal structural members and hoop supports that contain long oleophilic rods inside the cage to collect and agglomerate bitumen phase from the fluid to be separated and transfer it to at least one oleophilic sieve that partly projects into the cage for transfer of bitumen phase from the oleophilic rods to surfaces of the at least one sieve. The metal cage of the present invention is specifically designed to allow oleophilic sieve surfaces to project into the interior of the cage for transfer of collected bitumen from the oleophilic rods. The process also allows for the capture of bitumen phase from the aqueous phase as it passes through oleophilic sieve apertures.

Oleophilic separation in its present form uses the concept of introducing a bitumen, particulate minerals and water containing slurry fluid at a first temperature into the top half of a rotating cage for separation into a bitumen phase that contains oleophilic particulate mineral particulates and an aqueous phase that contains hydrophilic particulate minerals.

The rotatable metal cage has circular end walls and hoops joined by at least four longitudinal structural members that are preferably evenly distributed along the cage circumference to form a rotatable metal cage. Shafts protrude from cage end walls and are mounted in bearings in a mechanical structure that allows the cage to be driven to rotate by a motor.

Separation of the fluid to be separated in the cage is achieved by oleophilic adhesion attachment of bitumen phase and bitumen wetted oleophilic minerals from the fluid to be separated upon contact with oleophilic surfaced rods that tumble inside the rotating cage.

The cage circumference along at least its two bottom longitudinal members is covered with at least one oleophilic sieve that assumes the form of straight lines between longitudinal structural members of the cage to allow transfer of bitumen and oleophilic minerals from the rods to the sieve surfaces whilst the aqueous phase of separation comprising water and hydrophilic mineral particulates leaves the cage by passing through apertures of the at least one oleophilic sieve. It will be understood by a person skilled in the art that the oleophilic sieve may deviate from a straight line due to the weight of cylindrical members on oleophilic sieve.

Some bitumen phase may also be captured by sieve surfaces from the aqueous phase as the aqueous phase passes through the sieve apertures.

The sieve revolves continuously with the cage, without major slippage on the longitudinal members, along at least the two bottom longitudinal members and from there through a hot zone; and from the hot zone back to the cage longitudinal structural members. Bitumen phase collected on the at least one sieve along the cage is heated in the hot zone to a second temperature that is greater than the first temperature to reduce viscosity of the bitumen phase and cause bitumen and contained oleophilic particulate minerals to flow into a collection container for further processing whilst water and predominantly hydrophilic minerals leave the cage through apertures in the sieve for disposal or further processing.

In the Figures of the present invention, the cages rotate counter clockwise but the same results are achieved when the cage rotates clockwise.

The process has application in processing oil sand slurries, oil sand effluent, oil sand tailings fluid fine tailings (FFT) and oil sand extraction intermediate streams.

There is provided an oleophilic separation apparatus that has a rotatable metal cage, a motor for rotating the rotatable metal cage, a feed source in fluid communication with an interior of the rotatable metal cage, a hot zone, at least one oleophilic sieve, at least one cylindrical member within the rotatable metal cage and a collection container. The rotatable metal cage has a pair of end walls. The pair of end walls has a shaft projecting outwards from each end wall. A hoop support is mounted to an interior surface of each of the end walls. At least four longitudinal members are supported by the hoop supports. The rotatable metal cage has a hollow interior. The motor for rotating the rotatable metal cage is in communication with the shaft that projects outwards from each end wall. The feed source feeds a fluid to be separated into an aqueous phase and a bitumen phase into the top half of the rotatable metal cage. The interior of the rotatable metal cage is at a first temperature. The hot zone has at least one rotation member and a source of heat. The hot zone has a second temperature that is greater than the first temperature of the rotatable metal cage. The oleophilic sieve is provided in frictional engagement with the at least four longitudinal members and the at least one rotation member of the hot zone. The at least one oleophilic sieve is made of an oleophilic material such that the bitumen phase adheres to the oleophilic sieve upon contact. The at least one oleophilic sieve having a plurality of apertures to allow the aqueous phase to escape from the rotatable metal cage. At least one cylindrical member with an oleophilic surface is provided. The cylindrical member is sized to fit within the hollow interior of the rotatable metal cage such that the length of the at least one cylindrical member is at least 90% the length of the hollow interior. The at least one cylindrical member tumbles within the hollow interior of the rotatable metal cage and collects at least a portion of the bitumen phase within the rotatable metal cage and transfers at least a portion of the bitumen phase to the at least one oleophilic sieve. The collection container is positioned below at least one of the at least one rotation members of the hot zone for collection of the bitumen phase. The second temperature of the hot zone is sufficient to allow at least a portion of the bitumen phase to be released from the oleophilic sieve into the collection container.

In one embodiment, the rotatable metal cage has no more than twelve longitudinal members.

In one embodiment, the inside length of the rotatable metal cage between the pair of end walls is at least 1.2 times an inner diameter of the hoop supports.

In one embodiment, the total volume of the at least one cylindrical members positioned within the rotatable metal cage is less than the volume of the fluid to be separated within the rotatable metal cage.

In one embodiment, at least two cylindrical members are positioned within the rotatable metal cage. The cylindrical members transferring at least a portion of the bitumen phase to each other or to the oleophilic sieve.

In one embodiment, the at least one oleophilic sieve is made of multiple wraps of at least one endless rope around the at least four longitudinal members. The endless rope is supported by a rake attached to the at least four longitudinal members. The rake has a plurality of grooves for separating the wraps of the endless rope such that each wrap of the rope is separated from the adjacent wrap to create the plurality of apertures. The rake may separate the wraps such that each wrap is equidistant from each other. The endless ropes may be multistrand ropes of plastic or metal.

In one embodiment, the plurality of grooves of the rake apply pressure to each wrap to prevent slippage of the endless rope on the rake.

In one embodiment, the rotatable metal cage is separated into a first portion and a second portion by a solid disc. The solid disc prevents intermingling of fluids to be separated from the first portion and the second portion of the rotatable metal cage.

In one embodiment, at least one additional hoop support is placed between the pair of end walls and attached to the at least four longitudinal members to provide additional support to the rotatable metal cage.

In one embodiment, the at least one oleophilic sieve comprises a metal endless conveyer having apertures to allow the aqueous phase to pass through. The metal endless conveyer may be made of a plurality of metal strips bent into square waves and joined by rods. The metal endless conveyer may have a chain link formation.

In one embodiment, each of the at least one oleophilic sieves is supported by a hoop support on each side.

In one embodiment, a sprocket is provided for synchronizing the movement of the at least one oleophilic sieve and the rotatable metal cage.

In one embodiment, the at least one oleophilic sieve is covered with an oleophilic coating.

In one embodiment, the at least one oleophilic sieve deviates no more than ten degrees from vertical when traveling from the rotating metal cage to the at least one rotation member of the hot zone.

In one embodiment, the source of heat of the hot zone is a radiant heat source positioned above the at least one oleophilic sieve to heat the bitumen phase and allow at least a portion of the bitumen phase to be released from the at least one oleophilic sieve.

In one embodiment, there are two rotation members in the hot zone. In another embodiment, there are three rotation members in the hot zone.

In one embodiment, a scraper contacts that at least one rotation member of the hot zone to remove the bitumen phase from the surface of the at least one rotation member.

In one embodiment, jets of air cool the oleophilic sieve and clear the plurality of apertures of the oleophilic sieve before it returns to the rotatable metal cage. In another embodiment, jets of water cool the oleophilic sieve and clear the plurality of apertures of the oleophilic sieve before it returns to the rotatable metal cage.

In one embodiment, a heat deflector is placed above the heat source for directing the heat to the at least one oleophilic sieve in the hot zone.

In one embodiment, the fluid to be separated into an aqueous phase and a bitumen phase is sourced from fluid fine tailings.

In another embodiment, the fluid to be separated into an aqueous phase and a bitumen phase is sourced from a mined oil sand.

In another embodiment, the fluid to be separated into an aqueous phase and a bitumen phase is a mixture of fluid fine tailings and mined oil sand.

In another embodiment, the fluid to be separated into an aqueous phase and a bitumen phase is a mixture of fluid fine tailings and mined oil sand slurry.

In another embodiment, the fluid to be separated into an aqueous phase and a bitumen phase is prescreened to remove oversized materials that will not pass through the plurality of apertures in the at least one oleophilic sieve.

In another embodiment, the fluid to be separated into an aqueous phase and a bitumen phase is from a pond into which mined oil sand is deposited. The pond has a bottom layer and a top layer. The pond contains water to allow rocks, gravel and coarse sand to settle to the bottom layer of the pond and the top layer of the pond is used as the fluid to be separated.

In one embodiment, the hoop supports have a circular inside diameter.

In another embodiment, the hoop supports have an inside diameter in the form of a polygon having eight to twenty sides. The longitudinal members may be attached to the hoop supports at a mid point of each of the polygon sides. The number of sides of the polygon is generally twice the number of longitudinal members.

In one embodiment, the hoop supports have notches cut out for positioning the longitudinal members into the hoop supports.

In one embodiment, the fluid to be separated is a mixture of hydrophilic and oleophilic minerals with water and bitumen added to separate the hydrophilic minerals from the oleophilic minerals.

BRIEF DESCRIPTION OF THE FIGURES

FIG. 8 is similar to FIG. 1, except that hot drum(s) or rollers and sprockets (22) of FIG. 1 are all replaced with a set of rollers to guide one or more adjacent oleophilic sieves into the hot zone and one or more rollers or sprockets on tension shafts to guide the one or more oleophilic sieve beside back to the rotatable metal cage, depending on the number of endless oleophilic sieves used beside each other. Each oleophilic sieve passes under a source of radiant heat to cause bitumen phase to heat and leave each oleophilic sieve and flow in a collection container. In this Figure the rotatable metal cage is more than half full with fluid and cylindrical member having an oleophilic surface at a level adjusted to prevent premature exit of unprocessed fluid as aqueous phase.

FIG. 9 shows an alternate hot zone that uses super heated steam or hot air under significant pressure from nozzles to heat and blow bitumen phase from the oleophilic sieve. Alternately the nozzles may use a combined mixture of saturated steam and air under pressure. Another nozzle may blow cold water or cold air against the oleophilic sieve to cool it before the oleophilic sieve returns to the rotatable metal cage (not shown).

FIG. 10 is a drawing of a previous patent of the present inventor to show how oleophilic rope wraps can be prevented from rolling off a rotating drum or rotatable metal. Two pulleys redirect each endless rope to keep each of the two oleophilic sieves of multiple ropes properly positioned and constrained on the drum and roller above the drum. This will prevent wraps from rolling off a rotatable metal cage of the present invention and will prevent interference between two or more endless oleophilic sieves formed from multiple wraps.

FIG. 11 shows end view of a longitudinal member that comprises a half round steel bar. The bar is provided with a keyway type of groove to accept a rake for spacing multiple wraps of endless rope. A bolt keeps the rake securely inside the groove.

FIG. 12 shows a sectional drawing of a typical rake to accept endless rope wraps inserted in the longitudinal member of FIG. 11 and bolted in place in the groove. It shows two wraps located in two valleys of the rake.

FIG. 13 shows a side view of a rake that has elliptical profile cuts to squeeze wraps entering a rake groove to prevent slippage of wraps on the rotatable metal cage when the rotatable metal cage rotates. It shows two such wraps before the wraps engage with the rake.

FIG. 19 shows two cylindrical member having an oleophilic surface in the form of oleophilic rods close to each other, each provided with an endcap on both ends. The Figure also shows two rotatable metal cage end walls to illustrate the close proximity between oleophilic rod with endcaps and rotatable metal cage end walls. Oleophilic rod length plus endcaps should be close in length to the distance between rotatable metal cage end walls, or between rotatable metal cage end wall and rotatable metal cage solid disc if the rotatable metal cage is partitioned, for proper tumbling without misalignment of multiple rods in the rotatable metal cage and to prevent unprocessed fluid from passing out of the rotatable metal cage along rod ends.

FIG. 20 shows a cylindrical member having an oleophilic surface in the form of an oleophilic rod with endcaps between rotatable metal cage end walls with two end hoop supports supporting an oleophilic rod at the enlarged diameter of the endcaps. Other hoop supports of the rotatable metal cage (one shown at rotatable metal cage midpoint) do not normally contact the oleophilic surface of the rod.

FIG. 28 shows, above a rotatable metal cage, a hot zone in which the hot zone uses three internally heated drums.

FIG. 29 shows, above a rotatable metal cage, a hot zone in which the hot zone uses internally heated drums.

DETAILED DESCRIPTION OF THE APPARATUS

Apparatus Description

Figure 1:
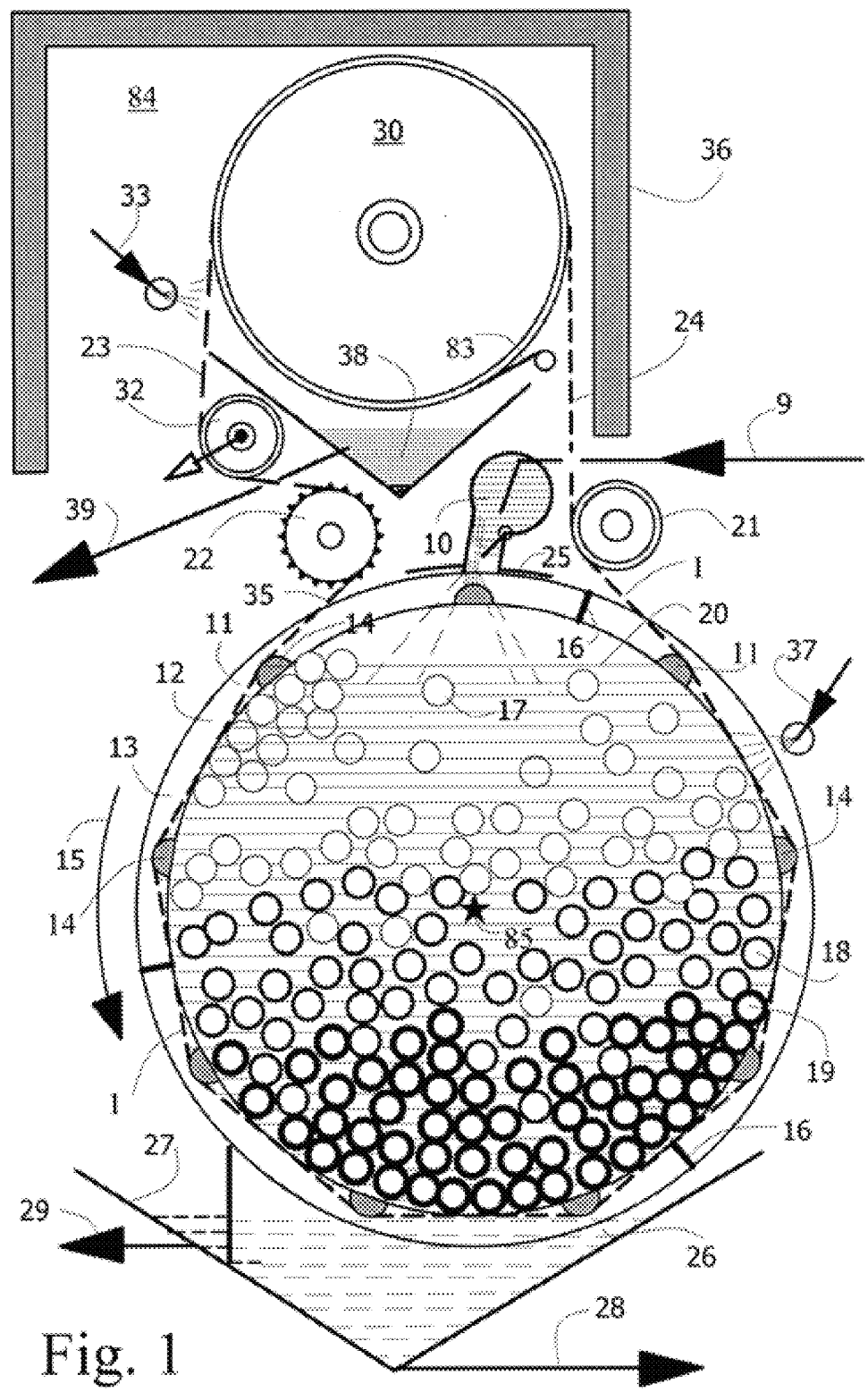
FIG. 1 illustrates an inside view of an oleophilic separator somewhere at the horizontal separator at mid length. It does not show in detail the structural members of a separator but only sufficient detail is provided to explain the invention and its operation. It shows one of the hoop supports of a rotatable metal cage which is filled with fluid for separation and with cylindrical member having an oleophilic surface in the fluid in the rotatable metal cage. An oleophilic sieve is wrapped around nearly the full rotatable metal cage circumference. The cage has nine longitudinal members, half round in cross section, to cause the oleophilic sieve, shown in dashed lines to assume the shape of an incomplete polygon with straight sides. Incomplete since the oleophilic sieve does not cover the top of the rotatable metal cage but leaves the rotatable metal cage to revolve through a hot zone where the oleophilic sieve passes over an internally heated drum. A tensioning drum keeps the oleophilic sieve in contact with the rotatable metal cage longitudinal members and the heated drum.

The apparatus described, illustrated and claimed in the present application features a rotatable metal cage formed from two end walls with a shaft protruding from the outside face of each end wall. The shaft may be supported in fixed bearings in a support structure that partly surrounds the apparatus and allows driven rotation of the rotatable metal cage through the use of gears, roller chains or sprockets and a motor. Alternately, the rotatable metal cage could be supported on two driven rollers, but normally the rotatable metal cage and contents are not heavy enough to warrant such driven rollers. The interior surface of each end wall has a hoop support attached to it through welding or any other method known in the art. The hoop supports help to prevent the flow of unprocessed fluid to be processed out of the rotatable metal cage near the end walls and the hoop supports may provide support for oleophilic rods as needed. Longitudinal structural members join end wall to end wall or hoop support to hoop support to form a metal cage. The number and placement of longitudinal structural members of a cage normally is limited to between four and twelve to allow close or near contact between oleophilic rods and oleophilic sieve surfaces. The tumbling oleophilic rods collect bitumen phase from the fluid to be separated and transfers it to the oleophilic sieve. The oleophilic sieve also captures some residual bitumen phase from the aqueous phase as it passes out of the rotatable metal cage by flowing through a plurality of apertures of the oleophilic sieve surrounding at least a portion of the rotatable metal cage. While revolving with the rotatable metal cage longitudinal structural members, the oleophilic sieve apertures progressively fill with bitumen in the direction of cage rotation depending on cage RPM. Often the apertures of the sieve leaving the cage are completely filled with bitumen phase unless cage rotation is too fast for such bitumen phase accumulation.

Definition of Bitumen for this Patent

In the present invention the word bitumen and term bitumen phase is used to describe bitumen from mined oil sands, from bituminous sands and from any streams or mixtures containing same. It also is used to describe any viscous hydrocarbon that has an affinity for oleophilic mineral particulates, including greases and including any other viscous hydrocarbon such as petroleum jelly that at a desired separation temperature has a strong affinity for oleophilic surfaces, particulate minerals or for other hydrocarbons. The bitumen phase may also include oleophilic minerals. Generally bitumen is a hydrocarbon that has a viscosity at oleophilic separation temperature approximately similar to tooth paste at room temperature but the viscosity of bitumen may vary, depending on the size of the apertures of the oleophilic sieve and the construction of the oleophilic sieve. The smaller the apertures, the lower the viscosity of bitumen phase that may be captured by an oleophilic sieve. Conversely, the larger the apertures, the higher the viscosity of bitumen phase that may be captured by an oleophilic sieve. Normally the apertures are smaller than one inch square (2.5 cm by 2.5 cm) but this depends on viscosity of bitumen contained in the fluid to be separated at cage temperature. It will be understood by a person skilled in the art that different sized apertures may be used depending upon the viscosity of the bitumen to be collected.

Definition of Temperatures

In the present invention the terms first temperature and second temperature are relative terms used to illustrate a difference in temperature. For example, the rotatable metal cage is at a first temperature which is colder than the second temperature of the hot zone used to remove bitumen from the oleophilic sieve. In one embodiment, the rotatable metal cage its contents are cold enough to cause bitumen phase in the fluid to be separated in the rotatable metal cage to have a viscosity similar to tooth paste when tooth paste is at room temperature. However, separation temperature may vary depending on the design and structure of the rotatable metal cage and on the oleophilic sieve used on the rotatable metal cage, such as wrap spacing or mesh size. The bitumen phase leaving the oleophilic sieve in a hot zone usually is warm and fluid enough for most of it to readily flow unaided from the sieve due to gravity. At other times jets of water or compressed air may be used to blow additional bitumen phase from the oleophilic sieve, which may cool the sieve as well.

Fluid Suitable for Separation by the Invention

Fluid suitable for separation by the apparatus is a fluid that normally contains bitumen, oleophilic particulate minerals, water and hydrophilic particulate minerals wherein the oleophilic particulate minerals have surfaces that are predominantly oleophilic (or hydrophobic) and the hydrophilic particulate minerals have surfaces that are predominantly hydrophilic (or oleo phobic).

The fluid may be any slurry of oil sand (bituminous sand) and water or any process stream of a water based process used for separating bitumen from oil sand slurry. The fluid may be oil sand tailings pond fluid fine tailings (FFT). The fluid may be a mixture of tailings pond FFT and mined oil sand dispersed into the FFT stirred and heated moderately as required to achieve dispersion of oil sand in the FFT.

The fluid may be bitumen froth from a froth flotation process to remove by oleophilic separation some water and some particulate minerals. The fluid may be a pipeline mixture of bitumen, water, oleophilic minerals and hydrophilic minerals for subsequent oleophilic separation of bitumen plus oleophilic minerals from water plus hydrophilic minerals.

The fluid may be a dry mine mineral deposit of valuable minerals and gangue mixed with bitumen and water to separate valuable oleophilic mineral particulates from hydrophilic gangue particulate minerals. The fluid may alternately be a wet marine deposit of valuable particulate minerals and gangue particulate minerals mixed with bitumen, and additional water as needed, to separate the predominantly valuable mineral particulates captured by bitumen from water and predominantly gangue particulate minerals.

The fluid may be wet or dry sand containing bitumen from an oil spill after the oil light ends have evaporated. The fluid may be hydrocarbon polluted soil mixed with water for processing.

The fluid may be a mixture of mined oil sand and tailings pond FFT which mixture has been thoroughly mixed after which mineral particulates of the mixture too large to pass through the oleophilic sieve have been removed before the fluid is separated.

Fluid fine tailings settle in mined oil sand tailings ponds between an upper water layer and a bottom sand, silt and fines layer. The FFT contains bitumen, water and unsettled mineral fines that may remain unsuspended for decades or centuries as a result of caustic used in oil sand processing. Originally tailings enter a tailings pond at a pH around 8.5 due to its caustic content but reacts over time with carbon dioxide from the air to change pH of the FFT closer to neutral. When oleophilic separation is used to process mined oil sand with pond FFT, both bitumen of the FFT and bitumen of the mined oil sand is recoverable.

The apparatus may also have application in separating a variety of other fluids that contain particulate oleophilic minerals and particulate hydrophilic minerals from a minerals mine or from a marine minerals deposit. For processing mine or marine minerals fluids, bitumen is added to provide the glue to cause adhesion of oleophilic minerals to the rods and to the sieve. Water is added along with bitumen when separating dry minerals fluid. The process may also be used to process hydrocarbon contaminated land sites or beach soils or sediments.

DETAILED DESCRIPTION OF THE PREFERRED EMBODIMENTS

Figure 3:
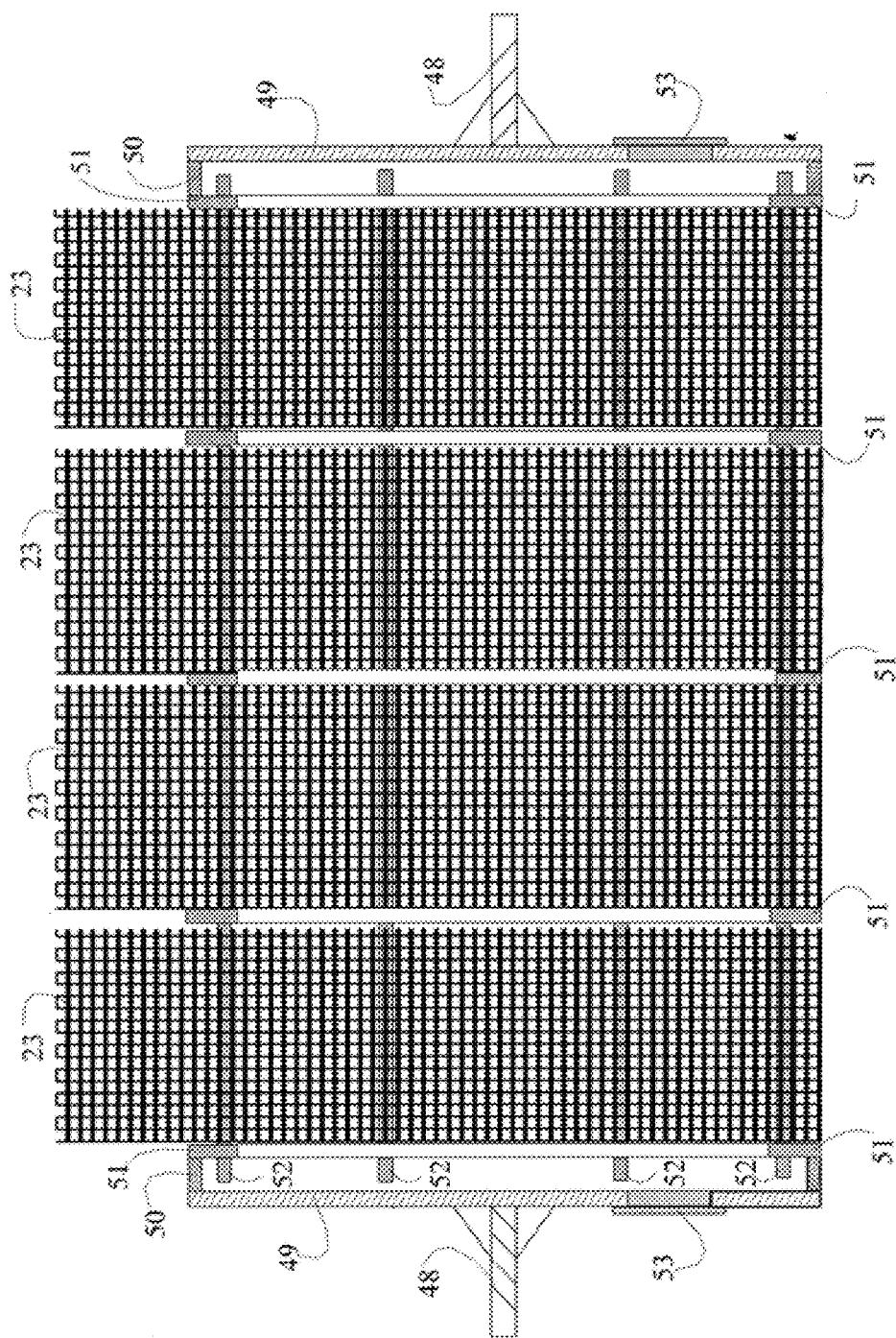
FIG. 3 is a side view of the rotatable metal cage covered with four metal flat wire conveyor type oleophilic sieves. It shows two rotatable metal cage end walls with protruding shafts. Each end wall is provided with a hoop support that accepts six longitudinal members to support the oleophilic sieves (two rear longitudinal members are hidden by two longitudinal members at the front). In this drawing three additional hoop supports are shown to support the longitudinal members to accept four flat wire metal conveyor type oleophilic sieves on the rotatable metal cage.

Referring to FIG. 3, an oleophilic separation apparatus has a rotatable metal cage (11) that has a pair of end walls (49), hoops supports (51), at least four longitudinal members (52) and a hollow interior. The pair of end walls (49) each have a shaft (48) projecting outwards from end walls (49) that are in communication with a motor for rotating the rotatable metal cage (11). Hoop supports (51) are mounted to an interior surface of each end wall (49) and longitudinal members (52) are supported by hoop supports (51). In the embodiment shown, additional hoop supports (51) are provided to provide additional structure support to rotatable metal cage (11).

Referring to FIG. 1, a feed source (10) is provided in fluid communication with the hollow interior of the rotatable metal cage (11) such that the feed of a fluid to be separated into an aqueous phase and a bitumen phase enters a top half of rotatable metal cage (11). The interior of rotatable metal cage (11) is at a first temperature.

A hot zone (84) has at least one rotation member (30) and a source of heat. In the embodiment shown rotation member (30) is a heated drum and acts as both rotation member and source of heat. It will be understood by a person skilled in the art that rotation member (30) and source of heat may be different. Hot zone (84) has a second temperature. The second temperature is greater than the first temperature. In the embodiments shown in FIG. 8 and FIG. 9, two rotational members (32) and (87) are provided. Rotation member (32) is a tension roller and rotation member (87) is a guide roller.

Referring to FIG. 1, an oleophilic sieve (1) is provided in frictional engagement with the longitudinal members (52) and rotation member (30) of hot zone (84). In the embodiment shown in FIG. 1, only a single oleophilic sieve (1) is shown. In the embodiment shown in FIG. 3, four oleophilic sieves (23) are shown. Referring to FIG. 1, oleophilic sieve (1) is made of an oleophilic material such that the bitumen phase adheres to oleophilic sieve (1) upon contact. Oleophilic sieve has a plurality of apertures to allow the aqueous phase to escape from rotatable metal cage (11). In the embodiment shown in FIG. 14, oleophilic sieve is made up of multiple wraps of endless rope (68, 69, 70, 71) wrapped around longitudinal members (52). The wraps of endless rope (68, 69, 70, 71) are separated to create the plurality of apertures of oleophilic sieve. In the embodiment shown in FIG. 3, oleophilic sieve is a metal flat wire conveyor. As can be seen, when multiple metal oleophilic sieves (23) are used, additional hoop supports (51) may be used to provide support to both sides of oleophilic sieve (23).

At least one cylindrical member having an oleophilic surface (17, 18, 19) are provided. Cylindrical members (17, 18, 19) are sized to fit within the hollow interior of rotatable metal cage (11) such that the length of the at least one cylindrical member is at least 90% the length of hollow interior. In the embodiment shown in FIG. 5, cylindrical member having an oleophilic surface (63) is of a length great enough to rest on hoop supports (51) but not so long as to contact both end walls (49). Referring to FIG. 1, a plurality of cylindrical members (17, 18, 19) are provided within hollow interior of rotatable metal cage (11) and tumble within hollow interior to collect at least a portion of the bitumen phase within rotatable metal cage (11). At least a portion of the bitumen phase is transferred from cylindrical members (17, 18, 19) to oleophilic sieve (1). It is preferred that the total volume of cylindrical members (17, 18, 19) positioned within rotatable metal cage (11) be less than the volume of fluid to be separated within rotatable metal cage (11).

A collection container (38) is positioned below rotation member (30) of hot zone (84) for collection of the bitumen phase. The second temperature of hot zone (84) is sufficient to allow at least a portion of the bitumen phase to be released from oleophilic sieve (1) into collection container (38).

A sprocket (22) may be provided to synchronize the movement of oleophilic sieve (1) and rotatable metal cage (11). This helps to prevent binding of oleophilic sieve (1) which can negatively impact the ability of the apparatus to separate bitumen phase from aqueous phase.

FIG. 1 illustrates an inside view of an oleophilic separator at horizontal separator at mid length. It does not show in great detail the structure of a separator but only provides sufficient detail to explain the present invention and its operation. It shows one of the hoop supports (12) of a rotatable metal cage (11) that is filled with fluid to be separated (9) from a feed source (10) to a predetermined level (20). Cylindrical members with oleophilic surfaces (17,18,19) are positioned within the rotating cage (11) and tumble within the fluid to be separated (9). An oleophilic sieve (1), shown in dashed lines, is wrapped around a portion of the rotatable metal cage (11) circumference. It will be understood by a person skilled in the art that oleophilic sieve (1) may deviate from a straight line between longitudinal members (14) due to the weight of cylindrical members with oleophilic surfaces (17,18,19) on oleophilic sieve (1). In the embodiment shown, rotatable metal cage (11) has nine longitudinal members (14), half round in cross section, to cause the oleophilic sieve (1) to assume the shape of an incomplete polygon with straight sides. Incomplete in polygon shape since the oleophilic sieve (1) does not cover the top of rotatable metal cage (11) and leaves rotatable metal cage (11) to revolve through a hot zone (84) and there passes over an internally heated drum (30) to heat the oleophilic sieve (1) and contained bitumen phase. From the hot zone, the sieve (35) returns to the cage (11).

Fluid (91 for separation, usually containing bitumen phase comprising bitumen and oleophilic particulate mineral and aqueous phase containing water and hydrophilic particulate mineral enters the cage at the top from a fluid source (10). It is preferable that fluid source (10) covers the length or nearly the full length of rotatable metal cage (11) to evenly distribute fluid (9) over the rotatable metal cage (11) length to partly fill the rotatable metal cage, which rotates during operation. It will be understood, however, that fluid source (10) may unevenly distribute fluid (9) within rotatable metal cage (11). To prevent splashing, a guard (25) may be mounted on fluid source (10).

Rotatable metal cage (11) which rotates (15) counter clockwise in FIG. 1, cylindrical members with oleophilic surfaces (17,18,19) circulate and tumble in rotatable metal cage (11) interior to collect bitumen phase from the fluid to be separated upon contact and transfer it between cylindrical members with oleophilic surfaces (17,18,19) and to the oleophilic sieve (1) upon contact or near contact. The oleophilic sieve (1) in FIG. 1 is supported by nine longitudinal members (14) to cause the oleophilic sieve to assume straight line sections between longitudinal members (14) in the form of an incomplete polygon which, as a result, project into rotatable metal cage (11) interior to achieve contact or near contact with the cylindrical members with oleophilic surfaces (17,18,19) for transfer of collected bitumen phase to the oleophilic sieve (1) from the rotatable metal cage (11), the oleophilic sieve (24) revolves to a hot zone (84). The oleophilic sieve is identified by (1, 24,23,35) to indicate different locations of the sieve in the figure but each represent the same oleophilic sieve.

The center of the rotatable metal cage (11) is shown by a star (85) and the level of fluid to be separated in the rotatable metal cage (11), which may vary, is shown as item (20). The rotatable metal cage (11) circumference is formed from hoop supports (12) comprising three ribs (12) cut from steel sheet welded together with welds (16). Longitudinal members (14) connect the hoop supports (12) to end walls (not shown). Aqueous phase of separation (29) leaves the rotatable metal cage (11) by passing through apertures of the oleophilic sieve (1, 35). Additional bitumen of the fluid to be separated may collect on oleophilic sieve surfaces as aqueous phase (29) of separation passes through sieve apertures. Aqueous phase (29) may flow into an aqueous phase receiver (26) if desired. When partially processed fluid (29), having left through the top left quadrant of the rotatable metal cage (11) contains an undesired amount of uncollected bitumen, it may flow into an auxiliary tank (27) and be returned as recycle (29) to the fluid source (10) for reprocessing. A water wash (37) at times may be useful to wash hydrophilic minerals from the oleophilic sieve (1) before it enters a hot zone (84).

A guide roller (21) directs the oleophilic sieve (1, 24) from the rotatable metal cage (11) to a hot zone (84) above the rotatable metal cage (11). Normally the oleophilic sieve section (24) that moves from the guide roller (21) to an internally heated rum (30) is vertical or less than 10 degrees from vertical to prevent bitumen phase falling from or down the sieve section (24) when the viscosity of bitumen adhering to the oleophilic sieve (24) is low. In the hot zone, the oleophilic sieve is in direct contact with the surface of the hot drum (30) to cause rapid heating of the oleophilic sieve and its contained bitumen phase. This causes the bitumen phase to become less viscous and more fluid and flow into a bitumen collection container (38) to become the bitumen product (39) of oleophilic separation.

A scraper (83) may contact the internally heated drum (30) to remove residual bitumen phase and mineral particulates from the surface of the rotating drum (30) and jets of cold air or cold water may be used to cool the oleophilic sieve surfaces (23) returning to the cold cage and blow some residual bitumen from the oleophilic sieve (32) surfaces into the collection container (38). A tensioning guide roller (32) provides tension in the oleophilic sieve (1,23,24, 35) and a roller or shaft and sprockets (22) directs the oleophilic sieve (35) back to the rotatable metal cage (11) longitudinal members (14). The hot zone (84) is enclosed in an insulated cover (36).

Figure 2:
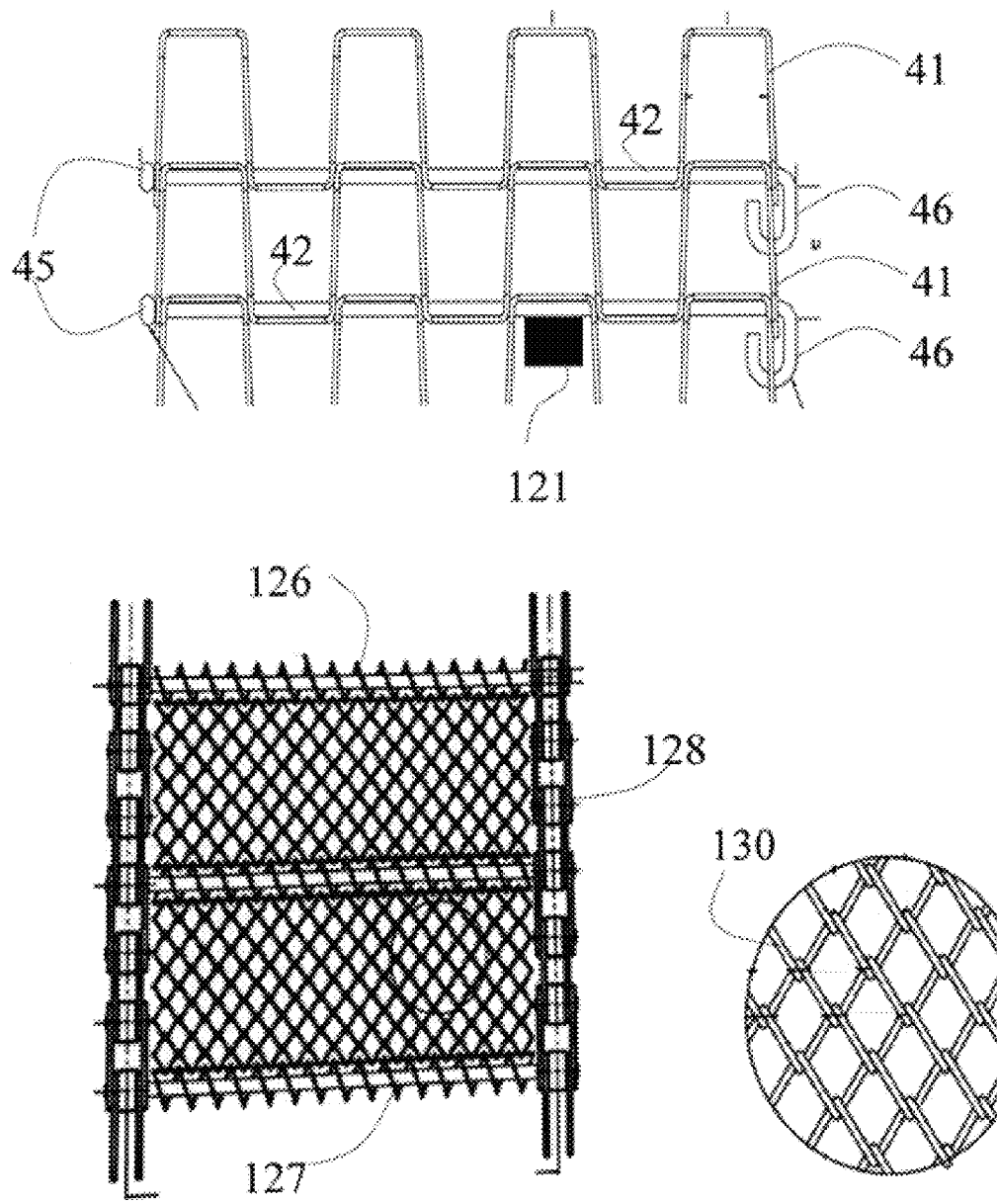
FIG. 2 shows construction details of two types of metal conveyor belt for serving as an oleophilic sieve. One type is called a flat wire belt and is formed from multiple narrow strips of metal provided with punched holes and thereafter formed into a square wave. Metal rods pass through the punched holes of the metal strips to join the square wave metal strips into a continuous mesh belt that is as thick as the height of the flat wire metal strips. The Figure also shows a mesh belt that is formed from adjacent metal spirals or coils that are threaded into each other, coil to coil to form a mesh belt that is as wide as the length of the coils and as long as the number of coils needed to form an endless belt of a desired length. This creates a chain link type of mesh belt. An enlarged detail drawing of the coils is shown beside the belt. Also shown on the belt is a roller chain for driving movement of the belt. Other types of metal conveyor belts may be used as well, provided these allow adhesion of bitumen phase to the belt surfaces and passage of aqueous phase through the belt apertures.

FIG. 2 shows construction details of two types of metal conveyor belt for serving as an oleophilic sieve. One type is called a flat wire belt and is formed from multiple narrow strips (41) of metal provided with punched holes and thereafter formed into a square wave. Metal rods (42) pass through the punched holes of the metal strips (41) to join the square wave metal strips into a continuous mesh belt that is as thick as the height of the flat wire metal strips. At the ends the metal rods (42) are either terminated in an expansion (45) or are curved in a bend (46) and hooked back through holes into the narrow strips (41). A black square (121) in FIG. 2 indicates a tooth of a sprocket for driving movement of the oleophilic sieve belt. At least two sprockets with teeth are normally used to drive movement of such a metal belt. FIG. 2 also shows a mesh belt that is formed from adjacent metal spirals or coils (126) that are threaded into each other, coil to coil, to form a mesh belt or chain link that is as wide as the length of the coils (126) and as long as the number of coils needed to form an endless belt of a desired length. An enlarged detail (130) drawing of the coils is shown beside the belt. Also shown on the belt is a roller chain (128) for driving movement of the belt. Other types of metal conveyor belts may be used as well, provided these allow adhesion of bitumen phase to the belt surfaces at a low temperature along the rotating metal cage bearing on longitudinal members, passage of aqueous phase through the belt apertures and release of adhering bitumen phase from the belt surfaces at an elevated temperature in a hot zone. The two oleophilic sieves of FIG. 2 differ in sieve aperture size to show oleophilic sieve details but often the actual sieve aperture sizes are similar. The coils (130) may be circular in shape or may be flattened.

FIG. 3 is a side view of a rotatable metal cage covered with four metal flat wire conveyor type oleophilic sieves (23). It shows two cage end walls (49) with protruding shafts (48). Each end wall (49) is provided with a hoop support (51) that accepts six longitudinal members (52) to support the oleophilic sieves (23). Two rear structural members are hidden by two structural members at the front. In this drawing, three additional hoop supports (51) are shown to support the longitudinal members (52) to accept four flat wire metal conveyor type oleophilic sieves (23) on the cage. Shown are also manholes with manhole covers (53) to allow insertion of cylindrical member having an oleophilic surface (not shown) into the rotatable metal cage.

Figure 4:
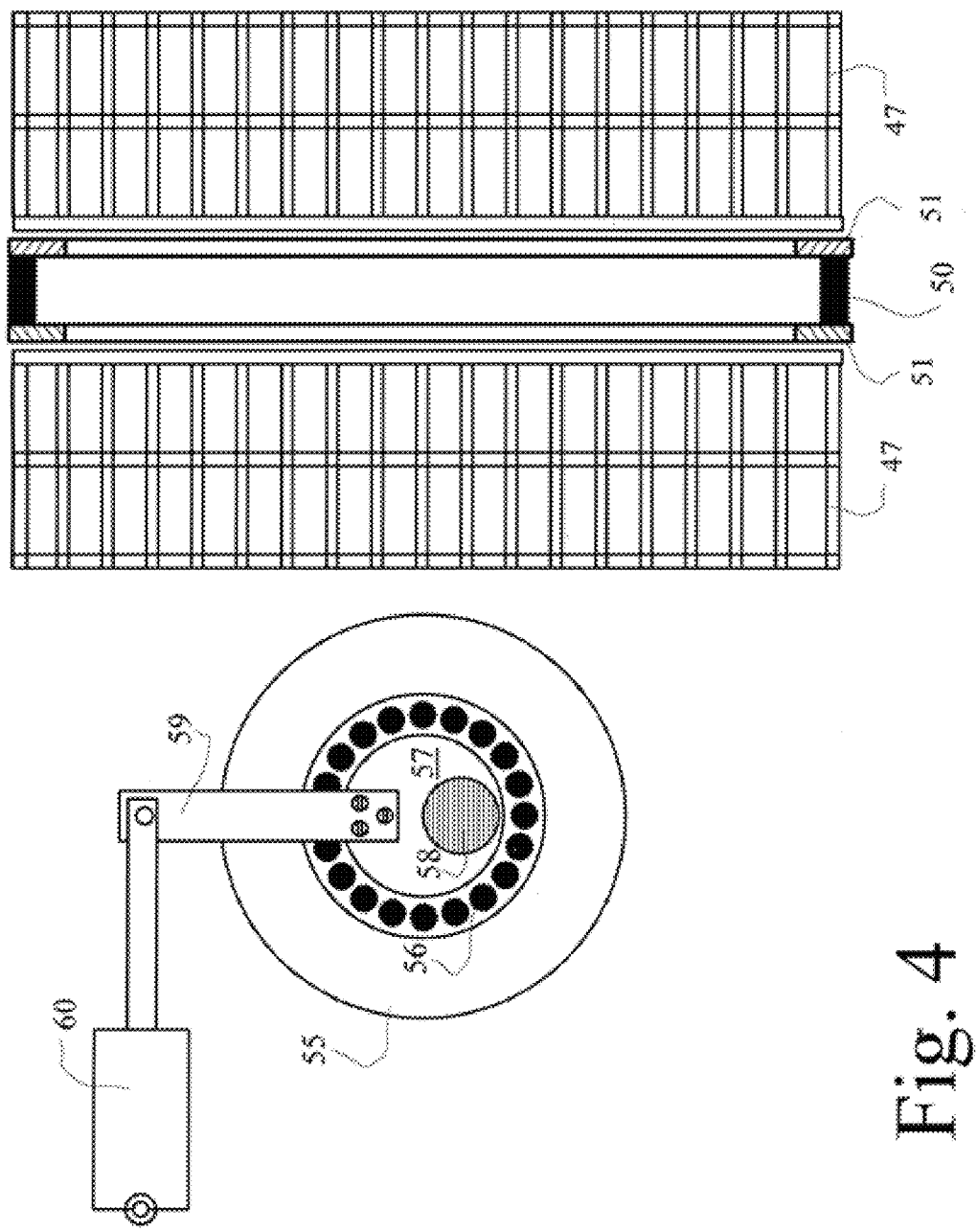
FIG. 4 illustrates a means to provide independent tension in each of the four oleophilic sieves of FIG. 3 where several oleophilic sieves are used and each needs to be tensioned separately. It also shows one method that may be used to space two oleophilic sieves on the rotatable metal cage by placing hoop support between them to prevent unprocessed fluid from leaving a cage past oleophilic sieve edges.

FIG. 4 illustrates a means to provide independent tension in each of the four oleophilic sieves, where the four oleophilic sieves used need to be tensioned separately to provide contact with rotatable metal cage and with hot roller, shown in FIG. 1. The tensioning device uses a mounting shaft (58) about equal in length to the rotatable metal cage of FIG. 3. Shorter shafts (57), equal in number to the number of oleophilic sieves used, are each provided with an offset hole to slide over the mounting shaft (58). Two rotary bearings (56) or bronze bushings are mounted into each short shaft (57) and a roller (55) or sprockets are mounted on each short shaft (57). A lever (59) is attached to each short shaft (57) at one end of the lever (59) and an air cylinder or an oil cylinder (60) is attached to the other end of the lever (59). As a result, four cylinders or sets of sprockets are put in individual tension on each of the four oleophilic sieves, as shown in FIG. 3. A separate part of FIG. 4 shows how two oleophilic sieves (47) spaced between two hoops (51) to allow room for the lever (59) of the tensioning device and for other reasons, for example when a roller chain is used on the edges of a oleophilic sieve, such as illustrated in FIG. 2.

Figure 5:
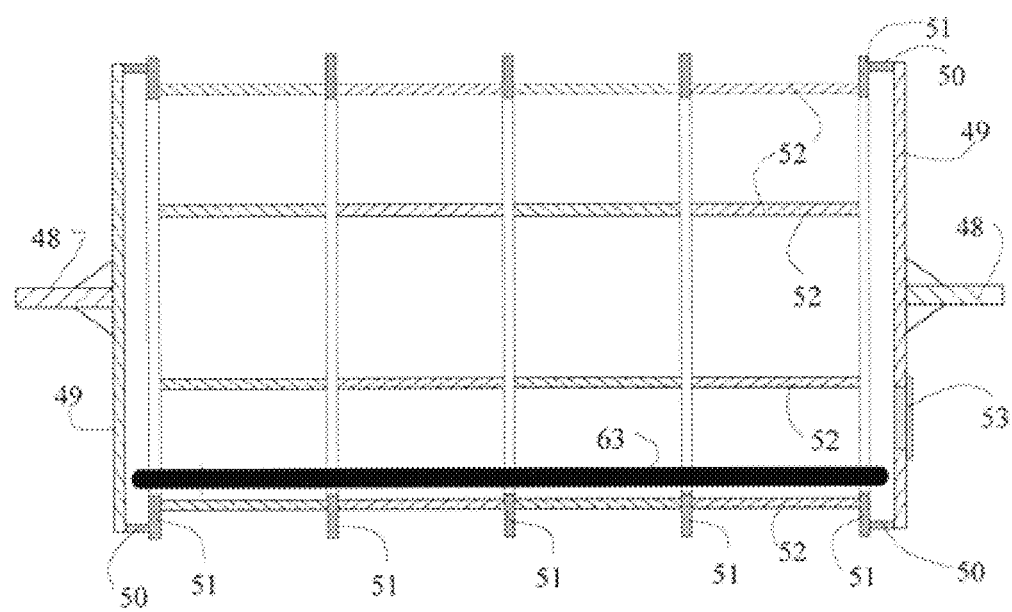
FIG. 5 shows assembled end walls, hoop supports and longitudinal members to form the rotatable metal cage. It shows a single cylindrical member having an oleophilic surface, shown as a rod or pipe in the rotatable metal cage. Many such rods normally are inserted through a manhole into the rotatable metal cage after the rotatable metal cage is covered with at least one oleophilic sieve.

FIG. 5 shows assembled end walls (49), hoops (51) and longitudinal members (52) to form rotatable metal cage. A single cylindrical member having an oleophilic surface (63) is shown in rotatable metal cage inserted through a manhole with cover (53). Many such rods (53) may be inserted through a manhole into rotatable metal cage after rotatable metal cage is covered with at least one oleophilic sieve.

Figure 6:
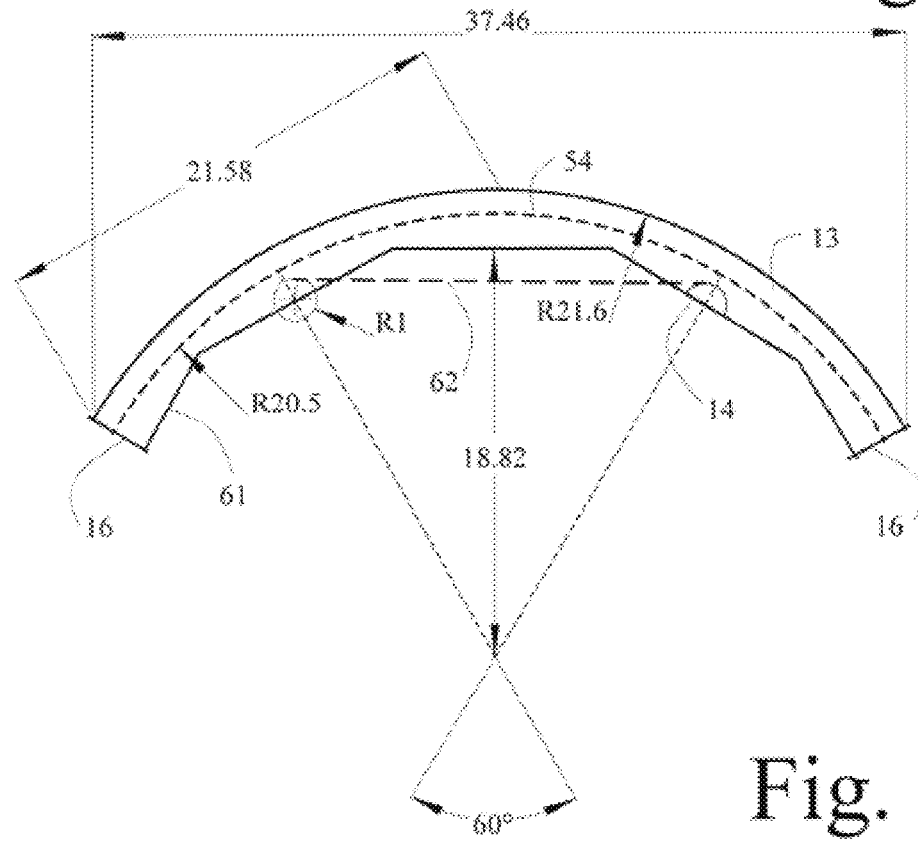
FIG. 6 shows typical dimensions of a rib cut from metal sheet that may be used to fabricate a hoop support when three such ribs are welded together. It is a template for cutting ribs of any size since it shows dimensions which all may be multiplied by a common factor. The rib shows cutouts for two longitudinal members to accept six such longitudinal members for constructing a hoop support which has a twelve sided polygon for the hoop support inside diameter.

FIG. 6 shows typical dimensions of a rib cut from metal sheet that may be used to fabricate a hoop support when three such ribs are welded together to form the hoop support. It is a template for cutting ribs of any size since it shows dimensions which all may be multiplied by a common factor for a desired rotatable metal cage diameter. The solid curve (13) of the template represents the maximum rotatable metal cage diameter and the dashed curve (54) of the template represents the minimum rotatable metal cage diameter. The rib shows cutouts for two half round (14) longitudinal members to accept six such longitudinal members for constructing a hoop support which has a twelve sided polygon for the hoop support inside diameter. Welds (16) join three ribs into a hoop support. A dashed line (62) shows one polygon side of an oleophilic sieve and the rib inner diameter (61) is one third of a twelve sided polygon.

Figure 7:
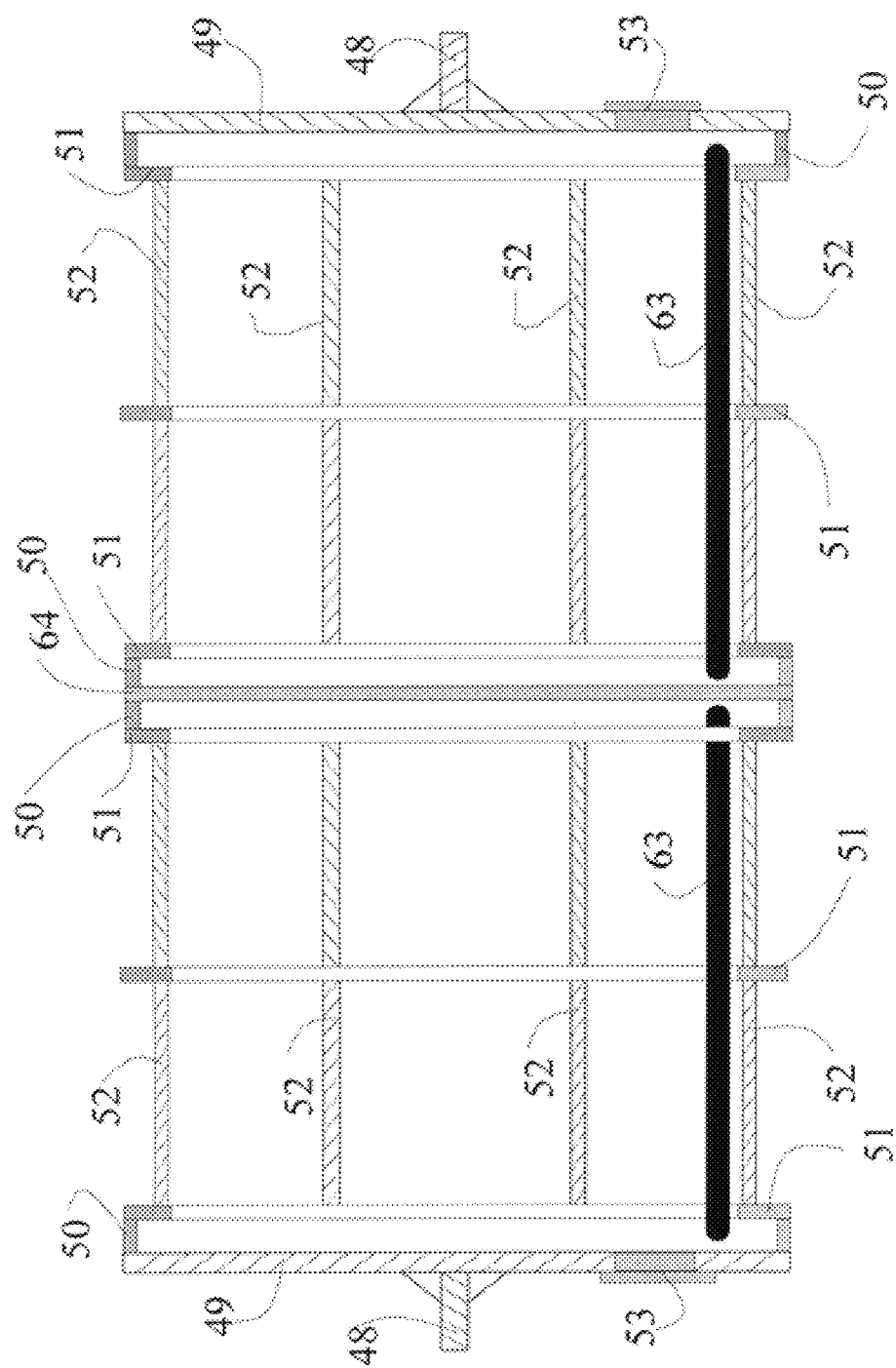
FIG. 7 is similar to FIG. 5 except that a solid disc with two hoop supports separates the rotatable metal cage into a first portion and a second portion. The Figure also shows two cylindrical member having an oleophilic surface inserted into the rotatable metal cage along with the two manholes needed to make that possible when both parts of the rotatable metal cage are covered with oleophilic sieves (not shown). This type of rotatable metal cage is used when two fluids are to be separated in one oleophilic sieve separator or when very long rotatable metal cages are used, in which case the solid disc allows for the use of shorter cylindrical member having an oleophilic surface.

FIG. 7 is similar to FIG. 5 except that a solid metal disc (64) with two hoop supports (51) separates the rotatable metal cage into a first portion and a second portion. The Figure also shows two cylindrical member having an oleophilic surface (63) inserted into the rotatable metal cage along with the two manholes with covers (53) that make it easier to insert cylindrical members (63) when both the first portion and second portion of the rotatable metal cage are covered with oleophilic sieves (not shown). Such a rotatable metal cage is used when two fluids are to be separated in one oleophilic sieve separator or when very long cages are used, in which case the central disc (64) allows for the use of shorter cylindrical member having an oleophilic surface. In this case the longitudinal members (52) join hoops (51) to hoop (51) and/or join end walls (49) to central disc (64) are slightly shorter than the distance between disc (64) face and end wall (49) inside face. Shaft protrusions (48) project outward from the end walls (49).

FIG. 8 is similar to FIG. 1, except that hot drum(s) or rollers or sprockets of FIG. 1 are replaced with only two sets of rollers, one roller (87) to guide the oleophilic sieve into the hot zone and one or more tension rollers (32) on a tension shaft as described in FIG. 4 to accept one or more oleophilic sieves beside each other, depending on the number of endless oleophilic sieves (1) used. Each oleophilic sieve (1) passes under a source (86) of radiant heat to cause bitumen phase to heat and leave each oleophilic sieve and flow in a collection container (38) to become the product of separation (39). In this Figure the rotatable metal cage (11) is more than half full with fluid to be separated and cylindrical member having an oleophilic surface at a fluid level (20) adjusted to prevent premature exit of unprocessed fluid to be separated as aqueous phase. Cylindrical member having an oleophilic surface (17,18,19) tumble inside the rotatable metal cage (11) when the rotatable metal cage rotates. Fluid to be separated (9) enters the rotatable metal cage (11) along the top. A heat deflector (78) may be placed above the source (86) of radiant heat in the hot zone (84) above the cage (11). Jets of air (34) or jets of water (33) may be used to blow residual bitumen phase from the sieves (1). An insulated cover (36) normally encloses the hot zone (84)

FIG. 9 shows an alternate hot zone (84) that uses super heated steam or hot air under significant pressure from nozzles (88) to heat and blow bitumen phase from the oleophilic sieve supported by a roller (87) at hot zone entrance and by several rollers (32) under tension as described with regards to FIG. 4. Alternately the nozzles (88) may use a combined mixture of saturated steam and air under pressure. Another nozzle (34) may blow cold air or water against the oleophilic sieve (dashed line) to cool it before the oleophilic sieve returns to the rotatable metal cage (not shown). A collection container (38) is mounted under the nozzles (88) to accept heated bitumen phase from the oleophilic sieve (dashed line) to become the product (39). An insulated cover (36) usually encloses the hot zone.

FIG. 10 is a drawing showing how oleophilic rope wraps can be prevented from rolling off a rotating drum or cage. Two pulleys redirect each endless rope to keep each of the two oleophilic sieves of multiple ropes properly positioned and constrained on the drum and on the roller above the drum. This helps to prevent wraps from rolling off the rotatable metal cage and helps to prevent interference between wraps of two or more endless sieves formed from multiple wraps.

FIG. 11 shows an end view of a longitudinal member (14) of rotatable metal cage (11) that comprises a half round steel bar. The bar is provided with a keyway type of groove to accept a rake (40) for spacing multiple wraps of endless rope. A bolt (67) keeps the rake securely inside the groove. A C-C section line is drawn in FIG. 11 which refers to the rake (40) of FIG. 12.

FIG. 12 shows a sectional drawing through C-C of FIG. 11. It shows a typical rake (40) section that is contoured to smoothly accept and space endless rope wraps (8). The rake (40) fits into the groove of the structural member (14) of FIG. 11 and is bolted in place by bolts (67) in the keyway type groove, except that the groove is normally deeper than a convention keyway used in shafts. FIG. 12 shows two wraps of endless rope (8) located in two valleys of the rake (40). Normally only about 25 percent of each wrap (8) is supported by the valleys (65) of the rake (40) and the crowns (66) of the rake normally are smooth to guide wraps (8) into rake valleys (65). Instead of bolts, the rake (40) may be brazed or silver soldered into the half round structure members (14) or cement or LOCTITE or similar substance may be used to keep the rake into the groove of the half round structural members (14).

FIG. 13 shows a side view of a rake (40) that uses elliptical profile cuts for the rake valleys (65) to apply pressure to wraps (8) entering a rake groove to discourage slippage of wraps on a rotatable metal cage (11) when the cage rotates. It shows two such wraps (8) before the wraps (8) engage with the valleys (65) between crowns (66) of the rake (40).

Figure 14:
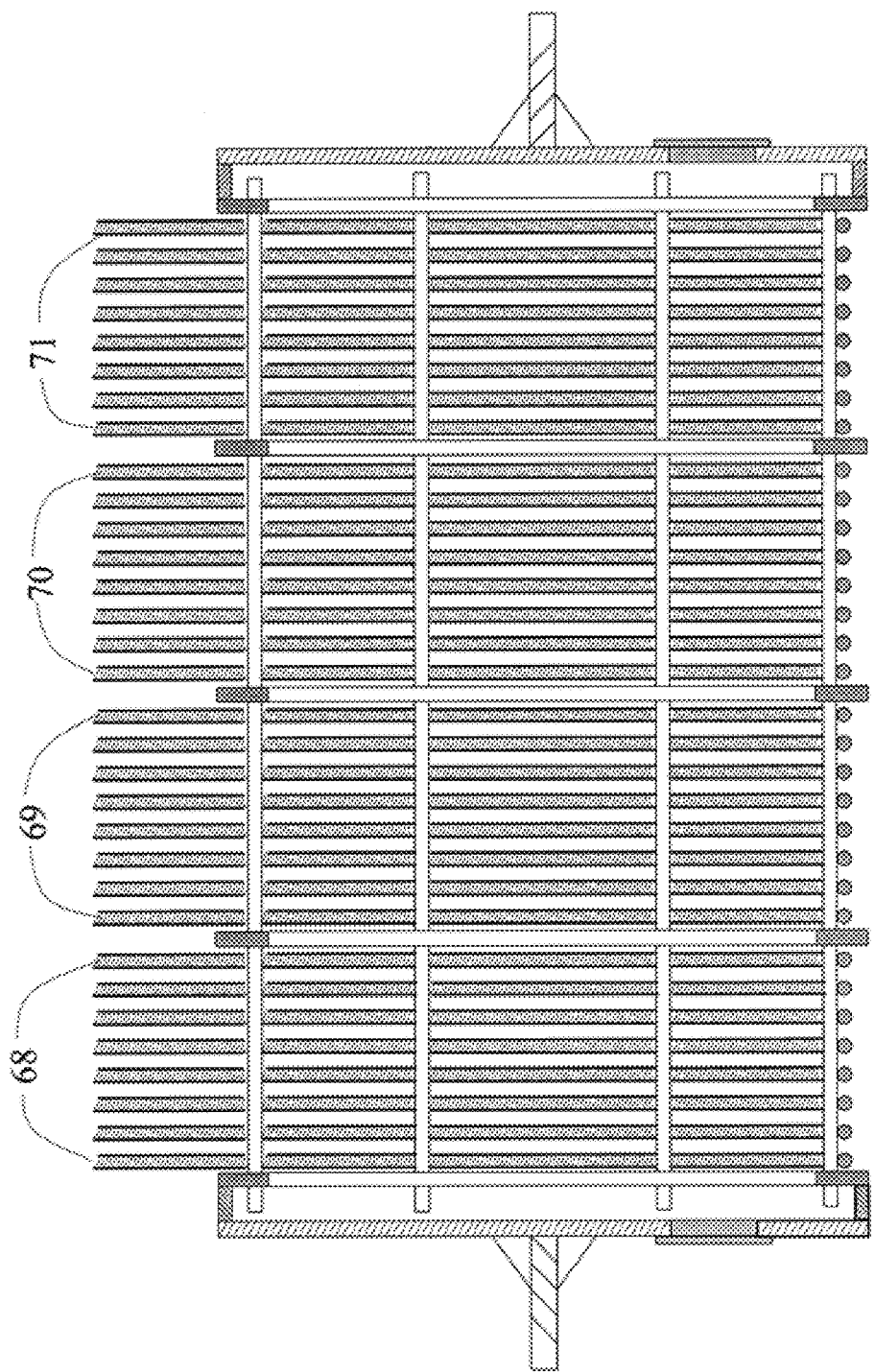
FIG. 14 is identical to FIG. 5 except that FIG. 14 does not show a cylindrical member having an oleophilic surface inside the rotatable metal cage but shows multiple wraps of endless rope surrounding the rotatable metal cage surface. These could be multiple wraps of a single endless rope, of two endless ropes or of four endless ropes. When more than one endless rope is used, separate tension rollers may be used for each endless rope, as illustrated and described with FIG. 4. The thickness of the ropes in FIG. 9 are exaggerated to show the basic concept of wraps on the rotatable metal cage. Instead of eight wraps between adjacent hoop supports, the actual number is dependent upon the size of the rotatable metal cage.

FIG. 14 is identical to FIG. 5 except that FIG. 14 does not show an oleophilic rod inside the cage but shows multiple wraps of endless rope (68,69,70,71) surrounding the cage surface. These could be multiple wraps of a single endless rope, of two endless ropes or of four endless ropes. When more than one endless rope is used, separate tension rollers may be used for each endless rope, as illustrated and described with FIG. 4. The thickness of the ropes in FIG. 9 are exaggerated to show the basic concept of wraps on rotatable metal cage (11). Instead of eight wraps between adjacent hoops the actual number may be many more depending on the size of the cage. Normally the width of space between adjacent wraps is approximately equal to the diameter of each wrap but may be larger or smaller. FIG. 3 is similar to FIG. 14 except that metal endless conveyor belts are used in FIG. 3 instead of multiple wraps of endless rope.

Figure 15:
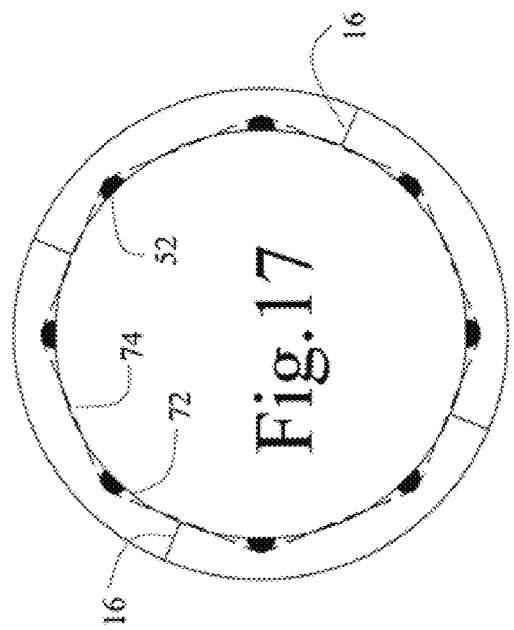
FIG. 15 shows a hoop support of the rotatable metal cage with six half round longitudinal members equally spaced along hoop support inside diameter. The outside hoop support diameter preferably is circular and the inside hoop support diameter is either circular or is in the shape of a polygon with twice as many sides as the number of longitudinal members used. The dashed line shows a wrap of rope contacting the crowns of all half round longitudinal members.

FIG. 15 shows a hoop support of rotatable metal cage with six half round longitudinal structural members (14) equally spaced along hoop support inside diameter. The outside hoop support diameter preferably is circular and the inside hoop support diameter is either circular (72) or is in the shape of a polygon (73) with twice as many sides as the number of structural members (14) used. The dashed line (74) shows an oleophilic sieve contacting the crowns of all half round longitudinal members (14). The longitudinal members (14) pass through holes in the hoop when the hoop inside diameter is a polygon (73) and pass through cutouts when the hoop inside diameter is a circle (72). Welds (16) are shown to form a hoop from three ribs.

Figure 16:
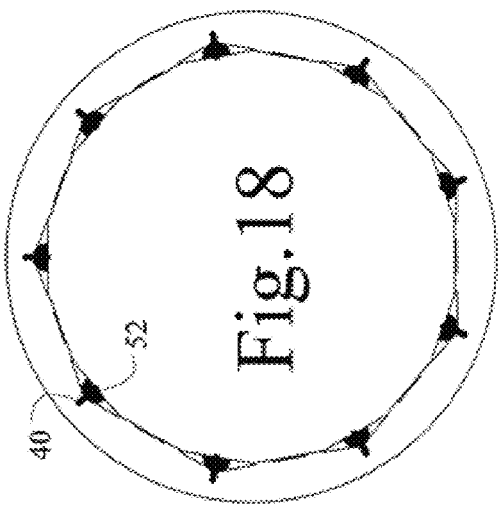
FIG. 16 illustrates a degree of projection of oleophilic sieve into the rotatable metal cage as a result of seven longitudinal members used on the rotatable metal cage that has an inside diameter in the form of a fourteen sided polygon. The longitudinal members are welded into cutouts in the hoop support and the dashed lines shows the oleophilic sieve surface projecting into the rotatable metal cage hollow interior.

FIG. 16 illustrates a degree of projection of oleophilic sieve (74) into the rotatable metal cage as a result of seven longitudinal members (14) used on a cage that has an inside diameter in the form of a fourteen sided polygon (73). The longitudinal members (14) are welded into cutouts in the hoop support. The dashed lines (74) show oleophilic sieve surfaces projecting into the interior of the rotatable metal cage. Welds (16) show that the hoop support is formed from seven ribs, each of identical shape. Generally, for an even number of longitudinal members of identical shape, the number of ribs to make a hoop support can be equal to half the number of longitudinal structural members used to form a cage. For an odd number of longitudinal members of identical shape, the number of ribs to make a hoop generally is equal to the number of longitudinal structural members. This is a general rule to minimize the number of ribs needed to form a hoop support but may have exceptions since it is a function of rib design.

Figure 17:
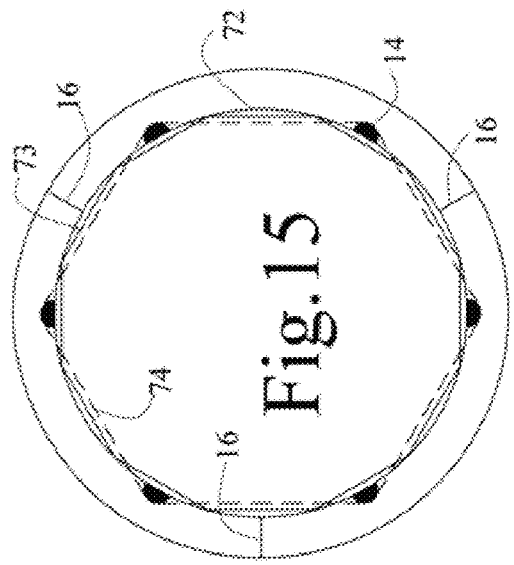
FIG. 17 illustrates a degree of projection of oleophilic sieve into the rotatable metal cage as a result of eight longitudinal members used on the rotatable metal cage that has a circular inside diameter. The longitudinal members are welded into cutouts in the hoop support along the circular hoop support inside diameter and the dashed lines show oleophilic sieve surface just barely projecting into the rotatable metal cage hollow interior.

FIG. 17 illustrates only a small degree of projection of oleophilic sieve into the rotatable metal cage as a result of eight longitudinal members (52) used on the rotatable metal cage that has a relatively circular inside diameter (72). The longitudinal members are welded into cutouts in the hoop support along the circular hoop inside diameter (72) and the dashed lines (74) show oleophilic sieve surfaces just barely projecting into the interior of the rotatable metal cage. In this embodiment, the hoop support is formed from four ribs as shown by the four welds (16). In some cases, depending on the type of oleophilic sieve used this is enough projection of oleophilic sieve surface into the rotatable metal cage interior to achieve the required transfer of bitumen phase from the cylindrical members having an oleophilic surface to the oleophilic sieve surfaces. In other cases the projection illustrated in FIGS. 16 and 15 is preferred.

Figure 18:
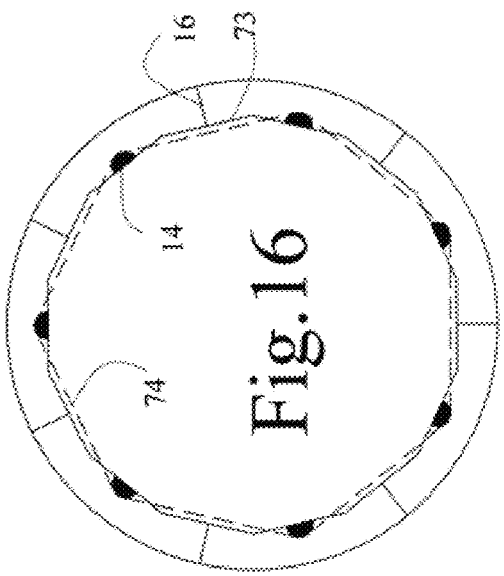
FIG. 18 illustrates a degree of projection oleophilic sieve into the rotatable metal cage as a result of nine longitudinal structural members used on the rotatable metal cage that has an inside diameter in the form of an eighteen sided polygon with longitudinal members. The longitudinal members are welded into cutouts in the hoop support polygon shaped inside diameter and the dashed lines show the oleophilic sieve surface just barely projecting into the rotatable metal cage hollow interior, similar to FIG. 17 which has a round inside diameter using eight longitudinal members.

FIG. 18 illustrates a degree of projection oleophilic sieve into the rotatable metal cage as a result of nine longitudinal members (52) used on the rotatable metal cage that has an inside diameter in the form of an eighteen sided polygon with longitudinal members. The longitudinal members are welded into cutouts in the hoop support polygon shaped inside diameter and the dashed lines show the oleophilic sieve surface just barely projecting into the interior of the rotatable metal cage, very similar to FIG. 17 which has a round inside diameter using eight longitudinal members. In this Figure, the longitudinal members contain rakes (40) to accept an oleophilic sieve of rope wraps of for example FIG. 12 or 13 but this, in some cases, may have little or no impact on the location of the oleophilic sieve surfaces. Comparing FIG. 18 with FIG. 17 shows that, using an inside hoop support diameter in the form of a polygon allows for more longitudinal members than using an inside hoop support diameter in the form of a circle. In both FIGS. 17 and 18 the projection of oleophilic sieve into the rotatable metal cage interior is essentially the same, but the number of longitudinal members used differs. Reducing the amount of steel in the longitudinal members of a cage, for example by reducing its diameter or shape, will weaken the strength of the rotatable metal cage or will require the need for additional hoop supports along rotatable metal cage length. Referring back to FIG. 15, which uses six longitudinal members, the number of longitudinal members could possibly be reduced to four, allowing the use of longitudinal members of great strength and limiting thereby the needed number of hoop supports even for long rotatable metal cages. Reducing the number of longitudinal members on the rotatable metal cage will tend to increase stress on the oleophilic sieve as a result of the weight of dense cylindrical members with oleophilic surfaces pressing down on the oleophilic sieve. Accordingly, rotatable metal cage design is influenced by oleophilic sieve strength and design, by density of cylindrical members with oleophilic surfaces inside the rotatable metal cage, by the number of longitudinal members on the rotatable metal cage, by the shape of hoop supports used, and by the number of hoop supports along the length of the rotatable metal cage. As a result, structural engineering calculations are recommended to optimize the design of commercial rotatable metal cages.

FIG. 19 shows two cylindrical members with oleophilic surfaces (75) close to each other, each provided with an endcap (77) on both ends. The Figure also shows two rotatable metal cage end walls (49) to illustrate close proximity between cylindrical members with oleophilic surfaces (75) ends with endcaps (77) and rotatable metal cage end walls (49). Cylindrical members with oleophilic surfaces length plus endcaps should be close in length to the distance between rotatable metal cage end walls, or distance between rotatable metal cage end wall and solid disc if rotatable metal cage is partitioned, for proper tumbling without misalignment of multiple cylindrical members with oleophilic surfaces in the rotatable metal cage and to prevent unprocessed fluid to be separated from passing out of the rotatable metal cage along cylindrical members with oleophilic surfaces ends. It is preferred that the cylindrical members with oleophilic surfaces (75) be at least 90% the length of the hollow interior of the rotatable metal cage. Each cylindrical members with oleophilic surfaces has an oleophilic surface (76) or is covered with an oleophilic covering (76) or coating.

FIG. 20 shows a cylindrical member with an oleophilic surface (75) with endcaps (77) between rotatable metal cage end walls (49) with two end hoop supports (79) supporting the cylindrical member with oleophilic surface at the enlarged diameter of the endcaps (77). Other hoop supports (80) of the cage (one shown at cage midpoint) do not normally contact the oleophilic surface (76) of the rod. When cylindrical members with oleophilic surfaces are prone to flexing in the rotating metal cage, a hoop support (80) at midpoint of the rotatable metal cage may be designed to allow contact with cylindrical members with oleophilic surfaces.

Figure 21:
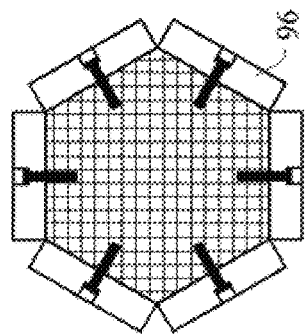
FIG. 21 shows a method for grooving steel flat bar to serve as longitudinal members to accept and evenly space wraps of endless rope. The flat bars are mounted on a hexagonal bar which is chucked in a lathe to cut grooves in the thus assembled six flat bars.

FIG. 21 shows a method for grooving steel flat bar to serve as longitudinal members to accept and evenly space wraps of endless rope. The flat bars (96) are mounted on a hexagonal bar (shown cross hatched) which is chucked in a lathe to cut grooves simultaneously in the thus assembled six flat bars (96).

Figure 22:
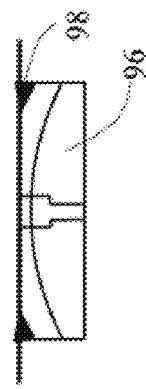
FIG. 22 shows a sectional view of a single longitudinal member machined as described with FIG. 21. The black triangles show the location of welds to attach the machined flat bar to the polygon inside of a hoop support rib illustrated in FIG. 27.

FIG. 22 shows a sectional view of a single longitudinal member (96) machined as described with FIG. 21. The black triangles (98) show the location of welds to attach the machined flat bar to the polygon inside of a rib illustrated in FIG. 27. The location of these welds (98) do not interfere with the wraps, as shown in FIG. 27

Figure 23:
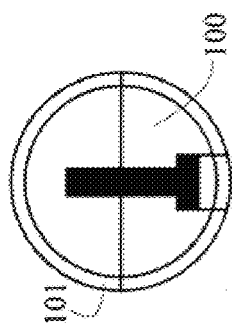
FIG. 23 show in cross section two steel half rounds bolted together to form a round bar longitudinal member to allow the resulting round bar to be machined with grooves in a lathe to accept rope wraps.
Figures 24, 25, 26, 27:
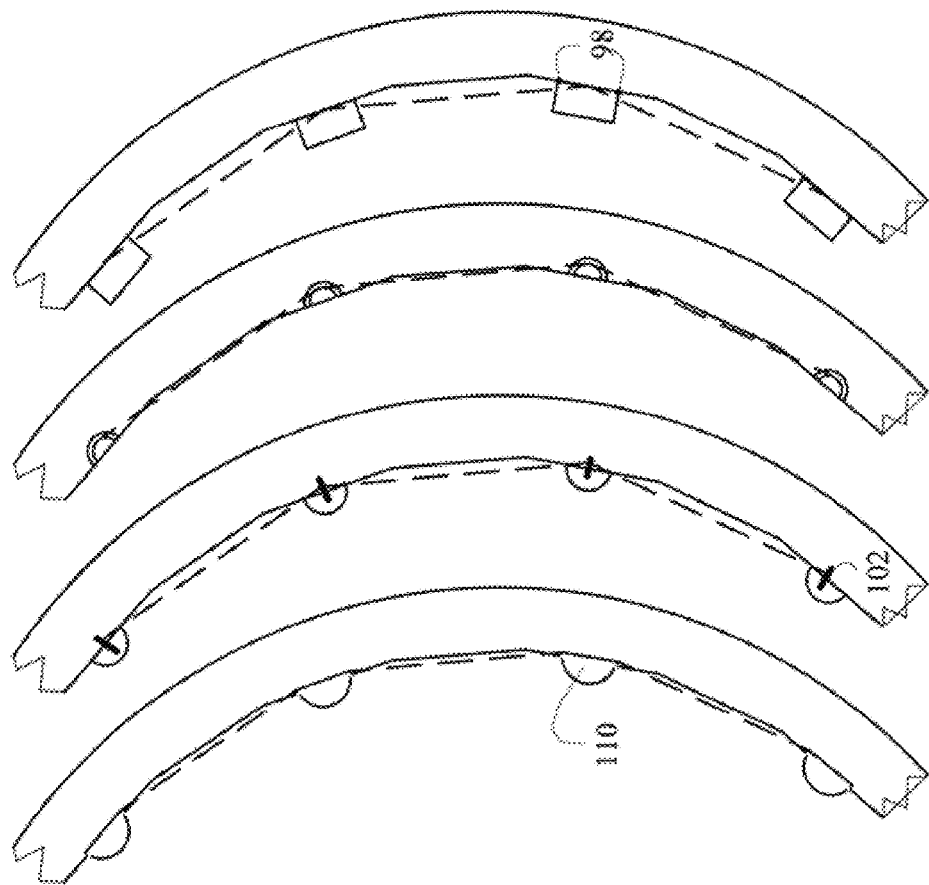
FIG. 24 shows half rounded longitudinal members inserted and welded into notches cut at mid point of alternate polygon sides of a hoop support rib. The dashed lines show a wrap that fits in grooves cut in the flat side of four half rounded longitudinal members.
FIG. 25 shows half rounded longitudinal members welded on the flat face of the longitudinal members at mid point of polygon sides of a hoop support rib. The half rounded longitudinal members are provided with rakes to accept and space rope wraps. The dashed lines show a wrap spaced on four rakes.
FIG. 26 shows the half rounded longitudinal members of FIG. 23 attached to notches cut at mid point of alternate polygon sides of a hoop support rib.
FIG. 27 shows the flat bar longitudinal members of FIG. 22 welded to the mid point of polygon sides of a hoop support rib.

FIG. 23 show in cross section two steel half rounded longitudinal members (100) bolted together to form a round bar to allow the resulting round bar to be machined with grooves (101) in a lathe to accept rope wraps, as illustrated on a rib in FIG. 26.

FIG. 24 shows half rounded longitudinal members inserted and welded into notches cut at mid point of alternate polygon sides of a hoop support rib. The dashed lines show a wrap that fits in grooves cut in the flat side of four half rounded longitudinal members (110).

FIG. 25 shows half rounded longitudinal members welded at the flat face of half rounded longitudinal members to mid point of polygon sides of a hoop support rib. The half rounded longitudinal members are provided with rakes to accept and space rope wraps. The dashed lines show a wrap spaced on four rakes. Similar to FIG. 24, the longitudinal members of FIG. 25 show curved surface inward into the rotatable metal cage to minimize disturbing with cylindrical members with oleophilic surfaces revolving or tumbling inside the rotatable metal cage. Unlike FIG. 11, where grooves are cut into the curved side of longitudinal members, in FIG. 25 the grooves are cut into the flat side of the half round longitudinal members and the half round surface of the longitudinal member provides for relatively smooth tumbling of with cylindrical members with oleophilic surfaces in the rotatable metal cage of the present invention, similar to FIG. 24. Compared with FIG. 26, it allows for deeper projection of oleophilic sieve surfaces into the rotatable metal cage interior.

FIG. 26 shows the half rounded longitudinal members (100) of FIG. 23 attached to notches cut at mid point of alternate polygon sides of a hoop support rib.

FIG. 27 shows flat bars of FIG. 22 welded to the mid point of polygon sides of a hoop support rib. The welds (98) do not interfere with wraps shown as dashed lines. However it can make tumbling of dense with cylindrical members with oleophilic surfaces inside the rotatable metal cage less smooth than is possible with the configurations shown in FIGS. 24 and 25.

FIG. 28 shows above the rotatable metal cage (11), a hot zone in which the hot zone uses two internally heated drums (89) to act as sources of heat. If needed, a guide roller (21) directs the oleophilic sieve (1) from the rotatable metal cage (11) to the heated drums (89) and another guide roller (22) or shaft with sprockets guides the oleophilic sieve (1) back to the rotatable metal cage (11). When the rotatable metal cage is only partly filled with fluid to be separated, as shown in FIG. 8, the guide rollers (21 and 22) are not needed and roller (91) may be a shaft with sprockets. A scraper (92) may be used to remove mineral matter and bitumen phase from the first heated drum as needed. Jets (94) of compressed air or water may be used as needed to blow residual bitumen phase from the oleophilic sieve (1) and cool it. Alternately, a fan (95) may be used to cool oleophilic sieve (1) before returning to the rotatable metal cage (11).

FIG. 29 shows above the rotatable metal cage (11), a hot zone in which the hot zone uses three internally heated drums (90) as sources of heat. A guide roller (21), if needed, directs the oleophilic sieve (1) from the rotatable metal cage (11) to the heated drums (90) and another guide roller (22) or shaft with sprockets guides the oleophilic sieve (1) back to the rotatable metal cage (11). Again, when the rotatable metal cage is about half full of fluid to be separated and cylindrical members with oleophilic surfaces, these two guide rollers (21,22) may not be needed. A scraper (92) may be used to remove mineral matter and bitumen phase from the first heated drum as needed. Jets (94) of compressed air or water may be used as needed to blow residual bitumen phase from the oleophilic sieve (1).

Noteworthy is that when comparing one, two and three internally heated drums as sources of heat for a hot zone, there is a relationship between total drum volume to contain a given amount of available condensing steam and available drum surface area to transfer heat from the condensing steam to an oleophilic sieve. For a constant total combined drum volume containing condensing steam, the larger number of drums used, the larger the amount of drum surface area that is available for heat transfer from condensing steam to oleophilic sieve or sieves to heat bitumen phase on an oleophilic sieve contacting drum surfaces. Also impacting on this is the total amount of drum surface area actually in contact with oleophilic sieve surfaces. This requires the optimization of internally heated drum placement for optimum drum surface contact with oleophilic sieve surface. It also impacts on the type of oleophilic sieve most suitable for collecting and containing bitumen phase when moving along the rotating metal cage but also most suitable for releasing warm bitumen phase in the hot zone. The same observation is valid when considering heat transfer from superheated steam or hot oil in drums to transfer heat to oleophilic sieves.

Cylindrical members with oleophilic surfaces may be a combination of light density rods, intermediate density rods and dense rods. Light density rods that tend to occupy the vertical upper volume of the rotatable metal cage, the intermediate density rods the middle vertical volume of the cage and the dense rods the bottom vertical volume of the cage. However, because the rotatable metal cage rotates, there exists active mingling of the rods of the different densities inside the rotatable metal cage for capture of bitumen phase from the fluid to be separated inside the rotatable metal cage by the rods, transfer between the rods and from the rods to the oleophilic sieve covering at least part of the rotatable metal cage circumference. The rotatable metal cage may contain rods of one density, of two densities, of three densities or of more densities for a given fluid to be separated.

Several methods for projecting oleophilic sieves made from wraps of rope into the rotatable metal cage interior may be used. These may, for example, include:

1. Placement of the longitudinal members into the hoop support ribs interior between ribs inside and outside diameter or on the ribs inside diameter.
2. Selection of a suitable diameter of the hoop supports or other types of longitudinal members.
3. Optimizing the total number of longitudinal members on the rotatable metal cage for effective transfer of bitumen phase from fluid to be separated inside the rotatable metal cage to the oleophilic sieve along the rotatable metal cage circumference.
4. Optimizing the number of support hoops on the rotatable metal cage to minimize deformation of rotatable metal cage cross section due to pressure from oleophilic sieves.
5. Changing the cross sectional size and shape of the longitudinal members.
6. Changing the circular shape of the inside diameter of each hoop support into a polygon that has twice as many sides as the number of longitudinal members used for the rotatable metal cage.

Available Field Utilities

The type of hot zone selected for removing bitumen phase from the oleophilic sieve is a function of the facilities available at the oil sand lease or at the location where oleophilic separation is to be conducted.

Processing Combined Fluid to be Separated Mixtures

Oleophilic separation may also be used to process a mixture of fluid fine tailings from a tailings pond and freshly mined oil sand after rocks, gravel and coarse sand have been removed from the mixture before the mixture is processed by oleophilic separation.

Oleophilic separation may also be used to process a mixture resulting from adding mined oil sand to a pond that contains oil sand fluid fine tailings wherein rocks, gravel and coarse sand of the mined oil sand have settled to the bottom of the pond after which the rocks, gravel and coarse sand depleted upper layers of the pond is processed by oleophilic separation.

Oleophilic separation may also be used to process a mixture in which mined oil sand is deposited into a pond containing water to allow rocks, gravel and coarse sand to settle to the bottom of the pond after which the rocks, gravel and coarse sand depleted upper layers of the pond are processed by oleophilic separation.

Hot water may be added to the above three potential fluid to be separated if needed for fluid temperature control.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the words are included, but items not specifically mentioned are not exclude. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An oleophilic separation apparatus comprising:
   a rotatable metal cage having a pair of end walls, the pair of end walls having a shaft projecting outwards from each end wall, a hoop support mounted to an interior surface of each of the end walls, at least four longitudinal members being supported by the hoop supports, the rotatable cage having a hollow interior;
   a motor in communication with the shaft to rotate the rotatable metal cage;
   a feed source in fluid communication with an interior of the rotatable metal cage such that the feed of a fluid to be separated into an aqueous phase and a bitumen phase enters a top half of the rotatable metal cage, the interior of the rotatable metal cage being at a first temperature;
   a hot zone having at least one rotation member and a source of heat, the hot zone having a second temperature, the second temperature being greater than the first temperature;
   at least one oleophilic sieve being in frictional engagement with the at least four longitudinal members and the at least one rotation member of the hot zone, the at least one oleophilic sieve being made of an oleophilic material such that the bitumen phase adheres to the oleophilic sieve upon contact; the at least one oleophilic sieve having a plurality of apertures to allow the aqueous phase to escape from the rotatable metal cage;
   at least one cylindrical member having an oleophilic surface sized to fit within the hollow interior of the rotatable metal cage such that the length of the at least one cylindrical member being at least 90% the length of the hollow interior, the at least one cylindrical member tumbling within the hollow interior of the metal cage and collecting at least a portion of the bitumen phase within the rotatable metal cage and transferring at least a portion of the bitumen phase to the at least one oleophilic sieve; and
   a collection container positioned below at least one of the at least one rotation members of the hot zone for collection of the bitumen phase, the second temperature of the hot zone being sufficient to allow at least a portion of the bitumen phase to be released from the oleophilic sieve into the collection container.

2. The apparatus of claim 1 wherein an inside length of the metal cage between the pair of end walls is at least 1.2 times an inner diameter of the hoop support.

3. The apparatus of claim 1 wherein the total volume of the at least one cylindrical members positioned within the metal cage is less than the volume of the fluid to be separated within the metal cage.

4. The apparatus of claim 1 wherein at least two cylindrical members are positioned within the metal cage, the at least two cylindrical members transferring at least a portion of the bitumen phase to each other or to the oleophilic sieve.

5. The apparatus of claim 1 wherein the at least one oleophilic sieve comprises multiple wraps of at least one endless rope around the at least four longitudinal members, the endless rope being supported by a rake attached to the at least four longitudinal members, the rake having a plurality of grooves for separating the wraps of the endless rope such that each wrap of the rope is separated from the adjacent wrap to create the plurality of apertures.

6. The apparatus of claim 5 wherein the rake separates the wraps such that each wrap is equidistant from each other.

7. The apparatus of claim 5 wherein the at least one endless rope are multistrand ropes of plastic or of metal.

8. The apparatus of claim 5 wherein the plurality of grooves of the rake apply pressure to each wrap to prevent slippage of the endless rope on the rake.

9. The apparatus of claim 1 wherein the metal cage is separated into a first portion and a second portion by a solid disc, the solid disc preventing intermingling of fluids to be separated from the first portion and the second portion of the metal cage.

10. The apparatus of claim 1 wherein at least one additional hoop support is placed between the pair of end walls and attached to the at least four longitudinal members to provide additional support to the metal cage.

11. The apparatus of claim 1 wherein the at least one oleophilic sieve comprises a metal endless conveyer having apertures to allow the aqueous phase to pass through.

12. The apparatus of claim 11 wherein each of the at least one oleophilic sieves being supported by a hoop support on each side.

13. The apparatus of claim 11 wherein a sprocket is provided for synchronizing movement of the at least one oleophilic sieve and the rotatable metal cage.

14. The apparatus of claim 1 wherein each of the at least one oleophilic sieves is covered with an oleophilic coating.

15. The apparatus of claim 1 wherein the at least one oleophilic sieve deviates no more than ten degrees from vertical when travelling from the rotating metal cage to the at least one rotation member of the hot zone.

16. The apparatus of claim 1 wherein a scraper contacts the at least one rotation member of the hot zone to remove the bitumen phase from the surface of the at least one rotation member.

17. The apparatus of claim 1 wherein jets of air cool the oleophilic sieve and clear the plurality of apertures of the oleophilic sieve before it returns to the rotatable metal cage.

18. The apparatus of claim 1 wherein jets of water cool the oleophilic sieve and clear the plurality of apertures of the oleophilic sieve before it returns to the rotatable metal cage.

19. The apparatus of claim 1 wherein a heat deflector is placed above the heat source for directing heat to the at least one oleophilic sieve in the hot zone.

20. The apparatus of claim 1 wherein the fluid to be separated into an aqueous phase and a bitumen phase is sourced from a mined oil sand.

21. The apparatus of claim 1 wherein the fluid to be separated into an aqueous phase and a bitumen phase is prescreened to remove oversized materials that will not pass through the plurality of apertures in the at least one oleophilic sieve.

22. The apparatus of claim 1 wherein the fluid to be separated into an aqueous phase and a bitumen phase is from a pond into which mined oil sand is deposited, the pond having a bottom layer and a top layer, the pond containing water to allow rocks, gravel and coarse sand to settle to the bottom layer of the pond and the top layer of the pond being used as the fluid to be separated.

23. The apparatus of claim 1 wherein the hoop supports have a circular inside diameter.

24. The apparatus of claim 1 wherein the hoop supports have an inside diameter in the form of a polygon having eight to twenty sides.

25. The apparatus of claim 24 wherein the longitudinal members are attached to the hoop supports at a mid point of each of the polygon sides.

26. The apparatus of claim 24 wherein the hoop supports have notches cut out for positioning the longitudinal members into the hoop supports.

27. The apparatus of claim 24 wherein the number of sides of the polygon is twice the number of longitudinal members.

28. The apparatus of claim 1 wherein the fluid to be separated is a mixture of hydrophilic and oleophilic minerals with water and bitumen added to separate the hydrophilic minerals from the oleophilic minerals.

* * * * *